(12) United States Patent
Ikeda et al.

(10) Patent No.: US 11,031,610 B2
(45) Date of Patent: Jun. 8, 2021

(54) FUEL CELL STACK

(71) Applicant: HONDA MOTOR CO., LTD., Tokyo (JP)

(72) Inventors: Yuta Ikeda, Wako (JP); Naoki Inoue, Wako (JP); Yosuke Yoshizawa, Wako (JP); Masashi Wada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 16/360,062

(22) Filed: Mar. 21, 2019

(65) Prior Publication Data
US 2019/0296372 A1   Sep. 26, 2019

(30) Foreign Application Priority Data

Mar. 23, 2018  (JP) .............................. JP2018-056764
Dec. 20, 2018  (JP) .............................. JP2018-238228

(51) Int. Cl.
| | |
|---|---|
| *H01M 8/0276* | (2016.01) |
| *H01M 8/0273* | (2016.01) |
| *H01M 8/242* | (2016.01) |
| *H01M 8/24* | (2016.01) |
| *H01M 8/0247* | (2016.01) |
| *H01M 8/0297* | (2016.01) |
| *H01M 8/2465* | (2016.01) |

(52) U.S. Cl.
CPC ....... *H01M 8/0273* (2013.01); *H01M 8/0247* (2013.01); *H01M 8/0276* (2013.01); *H01M 8/0297* (2013.01); *H01M 8/242* (2013.01); *H01M 8/2459* (2016.02); *H01M 8/2465* (2013.01)

(58) Field of Classification Search
CPC ... H01M 8/0273; H01M 8/0297; H01M 8/242
See application file for complete search history.

(56) References Cited

U.S. PATENT DOCUMENTS

| | | | |
|---|---|---|---|
| 6,605,380 | B2 | 8/2003 | Chen et al. |
| 2017/0012300 | A1 | 1/2017 | Gaugler et al. |
| 2018/0040907 | A1 | 2/2018 | Ishida et al. |

FOREIGN PATENT DOCUMENTS

| | | |
|---|---|---|
| JP | 2015-191802 | 11/2015 |
| JP | 2016-048620 | 4/2016 |
| JP | 2017-509123 | 3/2017 |
| JP | 2018-022595 | 2/2018 |

OTHER PUBLICATIONS

Hashimoto et al. JP 2016-048620. Apr. 7, 2016. English machine translation by EPO. (Year: 2016).*
Japanese Office Action for Japanese Patent Application No. 2018-238228 dated Mar. 10, 2020.

* cited by examiner

*Primary Examiner* — James Lee
(74) *Attorney, Agent, or Firm* — Amin, Turocy & Watson, LLP

(57) ABSTRACT

A fuel cell stack includes a stack body formed by stacking a plurality of power generation cells. A first seal line of a first metal separator and a second seal line of a second metal separator protrude in a stacking direction of the stack body in a manner to contact a resin film. An insulator is provided with a first elastic seal member which contacts a second end seal line. The width of the first elastic seal member is larger than the maximum width of the second end seal line.

9 Claims, 15 Drawing Sheets

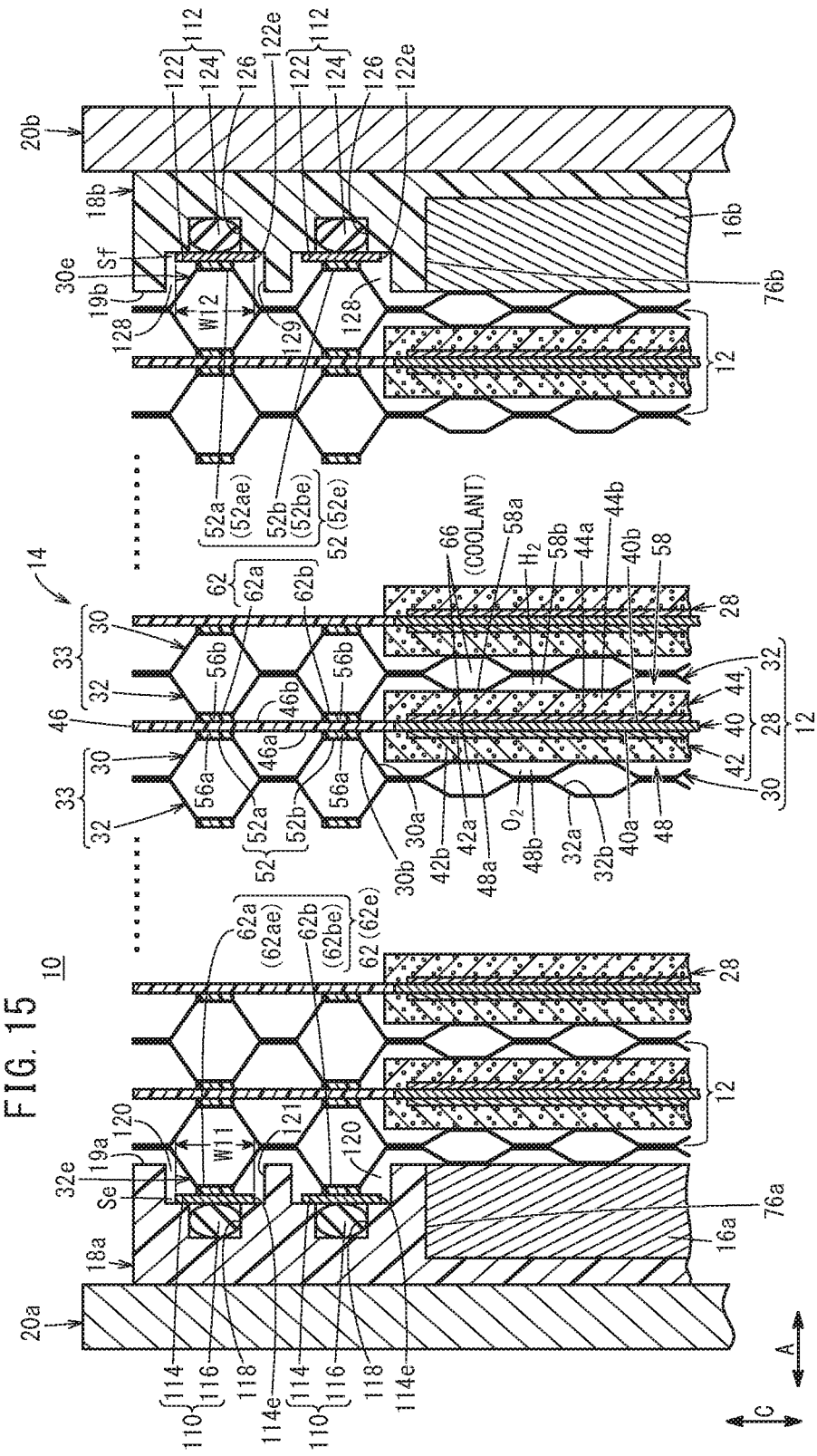

FUEL CELL STACK

CROSS-REFERENCE TO RELATED APPLICATIONS

This application is based upon and claims the benefit of priority from Japanese Patent Applications No. 2018-056764 filed on Mar. 23, 2018 and No. 2018-238228 filed on Dec. 20, 2018, the contents all of which are incorporated herein by reference.

BACKGROUND OF THE INVENTION

Field of the Invention

The present invention relates to a fuel cell stack formed by stacking a plurality of power generation cells each including a membrane electrode assembly and metal separators provided on both sides of the membrane electrode assembly. The membrane electrode assembly includes an electrolyte membrane and electrodes on both sides of the electrolyte membrane.

Description of the Related Art

For example, a solid polymer electrolyte fuel cell includes a membrane electrode assembly (MEA). The membrane electrode assembly includes an electrolyte membrane, an anode provided on one surface of the electrolyte membrane, and a cathode provided on the other surface of the electrolyte membrane. The electrolyte membrane is a polymer ion exchange membrane. The membrane electrode assembly is sandwiched between separators (bipolar plates) to form a power generation cell. For example, a fuel cell stack formed by stacking a predetermined number of power generation cells is mounted in a fuel cell vehicle (fuel cell electric automobile, etc.).

In some cases, as the separators, the fuel cell stack may adopt metal separators. In this regard, seal members are provided for the metal separators for preventing leakage of an oxygen-containing gas and a fuel gas as reactant gases and a coolant (e.g., see the specification of U.S. Pat. No. 6,605,380). Elastic rubber seals such as fluorine based seals or silicone seals are used as the seal members. Therefore, the cost required for providing the seal members such as the fluorine based seals or silicone seals pushes up the production cost disadvantageously.

In an attempt to address the problem, for example, as disclosed in Japanese Laid-Open Patent Publication No. 2015-191802, it has been common to adopt structure where, instead of the elastic rubber seals, sealing beads are formed in metal separators.

SUMMARY OF THE INVENTION

The present invention has been made in relation to the above conventional technique, and an object of the present invention is to provide a fuel cell stack which makes it possible to achieve the desired sealing performance at an end of a stack body in a stacking direction.

A fuel cell stack according to the present invention includes a stack body including a plurality of power generation cells stacked in a stacking direction, the power generation cells each including a membrane electrode assembly and metal separators provided on both sides of the membrane electrode assembly, the membrane electrode assembly including an electrolyte membrane and electrodes on both sides of the electrolyte membrane, wherein a seal bead protruding in the stacking direction of the stack body is formed in the metal separator in a manner that the seal bead contacts an outer portion of the membrane electrode assembly or a frame provided on the outer portion of the membrane electrode assembly, and insulators and end plates sandwiching the stack body in the stacking direction are provided at both ends of the stack body in the stacking direction in a manner that the seal bead is deformed elastically, and wherein the stack body includes end metal separators positioned at both ends in the stacking direction, an end seal bead protruding outward in the stacking direction is formed in each of the end metal separators, each of the seal beads and the end seal beads extends in a wavy pattern in a plan view viewed in the stacking direction, a seal member configured to contact the end seal bead is provided in an outer portion of the insulator or the end plate, and a width of the seal member is larger than a maximum width of the end seal bead.

Further, in the fuel cell stack, preferably, the seal member extends straight in a plan view viewed in the stacking direction.

Further, in the fuel cell stack, preferably, the end seal bead includes a first protrusion protruding in a direction perpendicular to a direction in which the end seal bead extends, and a second protrusion protruding in a direction opposite to the direction in which the first protrusion protrudes, and the width of the seal member is larger than a distance between a protruding end of the first protrusion and a protruding end of the second protrusion.

Moreover, in the fuel cell stack, preferably, a recess is formed in a surface of the insulator or the end plate facing the stack body, and the seal member is provided in the recess.

Further, in the fuel cell stack, preferably, each of the metal separator and the end metal separator includes:
a gas flow field configured to supply a reactant gas to the electrode and a plurality of fluid passages for the reactant gas and a coolant, and the seal bead and the end seal bead are provided around the gas flow field, and around the fluid passages.

Further, in the fuel cell stack, preferably, the end metal separator positioned at one end of the stack body in the stacking direction has same structure as the metal separator which contacts a surface of the outer portion or the frame of the membrane electrode assembly oriented toward another end in the stacking direction, and the end metal separator positioned at the other end of the stack body in the stacking direction has same structure as the metal separator which contacts a surface of the outer portion or the frame of the membrane electrode assembly oriented toward the one end in the stacking direction.

Furthermore, in the fuel cell stack, preferably, the entire seal member is made of elastic material.

Further, in the fuel cell stack, preferably, a recess is formed in the insulator or the end plate, and the seal member is provided in the recess, and the seal member includes a seal body configured to contact the end seal bead; and a fixed portion provided in the seal body, and wherein the seal body is spaced from side surfaces forming the recess, and the fixed portion is held between the side surfaces forming the recess.

Furthermore, in the fuel cell stack, preferably, the seal member includes a metal plate and an elastic seal member that are overlapped with each other at a position facing the end seal bead, and the metal plate is supported by the insulator, and positioned between the end seal bead and the elastic seal member.

In the present invention, the width of the seal member is larger than the maximum width of the end seal bead. In the structure, since the seal member can reliably contact the end seal bead, it is possible to achieve the suitable sealing performance at the end of the stack body in the stacking direction.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 15 is a cross sectional view showing still another example of structure of the fuel cell stack according to the present invention.

DESCRIPTION OF THE PREFERRED EMBODIMENTS

Hereinafter, preferred embodiments of a fuel cell stack according to the present invention will be described with reference to the accompanying drawings.

Figure 1:
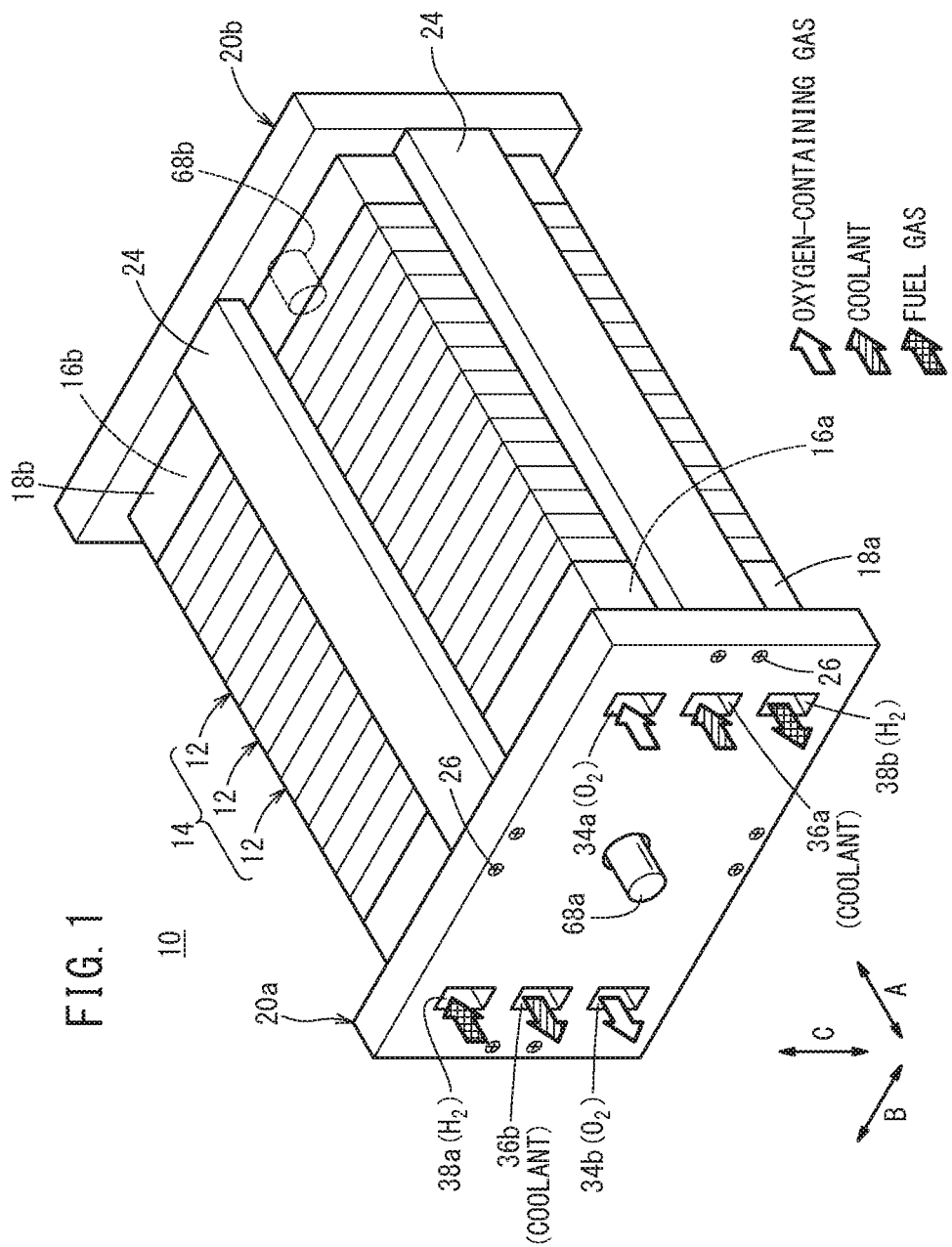
FIG. 1 is a perspective view showing a fuel cell stack according to an embodiment of the present invention.
Figure 2:
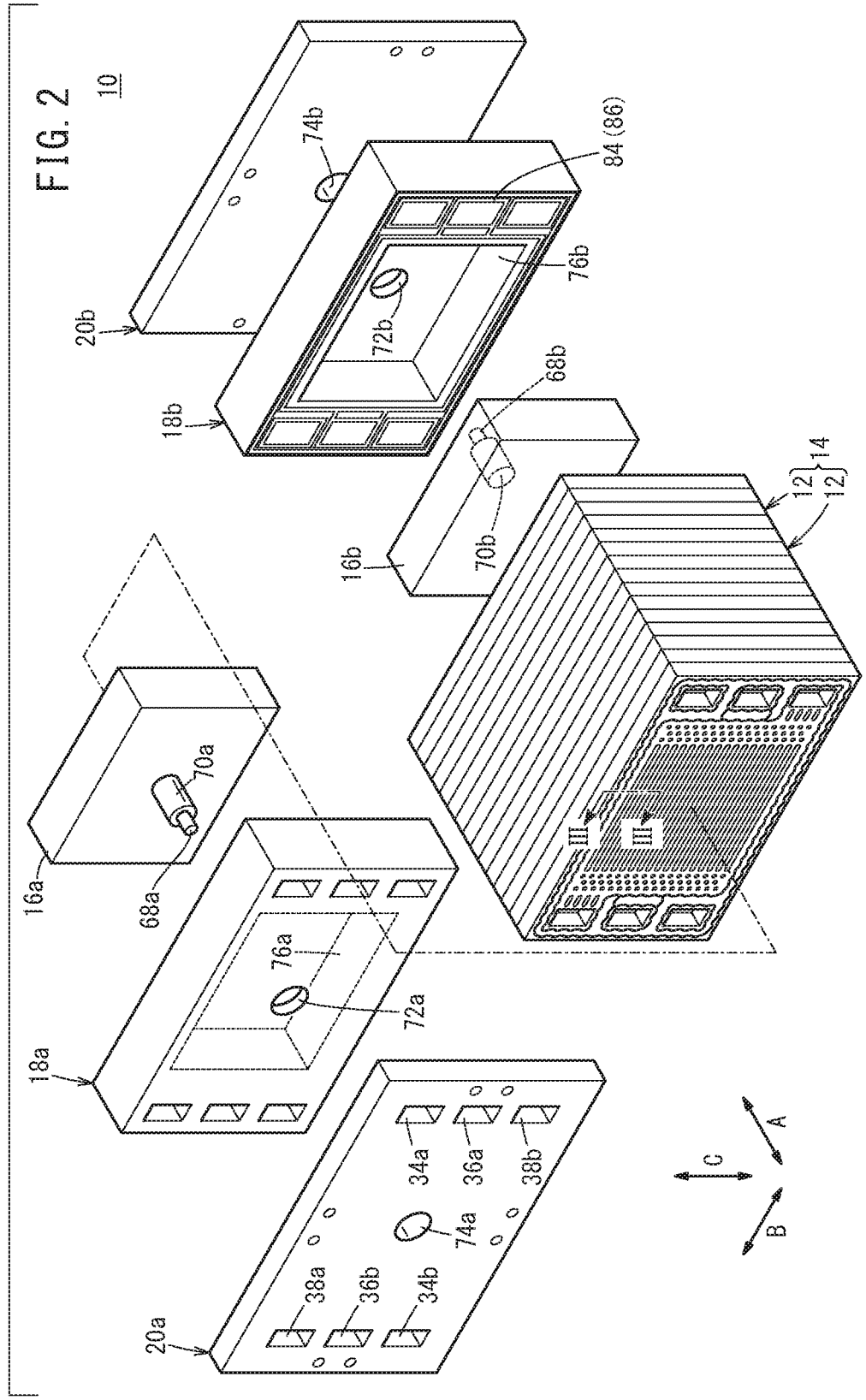
FIG. 2 is a partial exploded schematic perspective view showing the fuel cell stack.

As shown in FIGS. 1 and 2, a fuel cell stack 10 according to an embodiment of the present invention includes a stack body 14 formed by stacking a plurality of power generation cells 12 in a horizontal direction (indicated by an arrow A). It should be noted that the plurality of power generation cells 12 may be stacked together in a direction of gravity (indicated by an arrow C). For example, the fuel cell stack 10 is mounted in a fuel cell vehicle such as a fuel cell electric automobile (not shown).

In FIG. 2, at one end of the stack body 14 in the stacking direction (indicated by the arrow A), a terminal plate 16a is provided. An insulator 18a is provided outside the terminal plate 16a, and an end plate 20a is provided outside the insulator 18a. At the other end of the stack body 14, a terminal plate 16b is provided. An insulator 18b is provided outside the terminal plate 16b, and an end plate 20b is provided outside the insulator 18b.

As shown in FIG. 1, the end plates 20a, 20b have a laterally elongated (or longitudinally elongated) rectangular shape, and coupling bars 24 are provided between respective sides of the end plates 20a, 20b. Both ends of the coupling bars 24 are fixed to inner surfaces of the end plates 20a, 20b using bolts 26 to apply a tightening load to the stacked power generation cells 12 in the stacking direction indicated by the arrow A. It should be noted that the fuel cell stack 10 may have a casing including the end plates 20a, 20b, and the stack body 14 may be placed in the casing.

Figure 3:
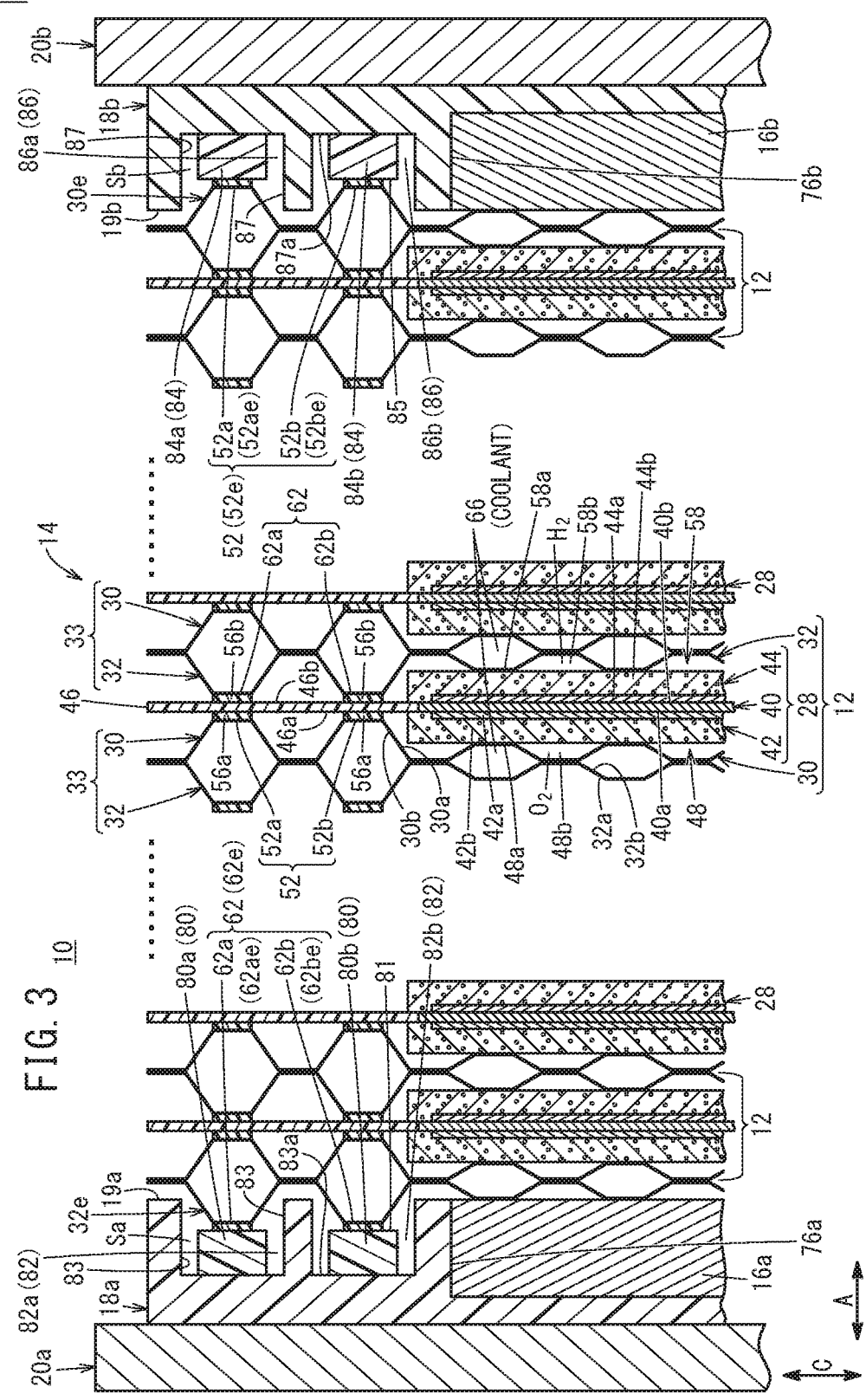
FIG. 3 is a cross sectional view taken along a line III-III in FIG. 2.
Figure 4:
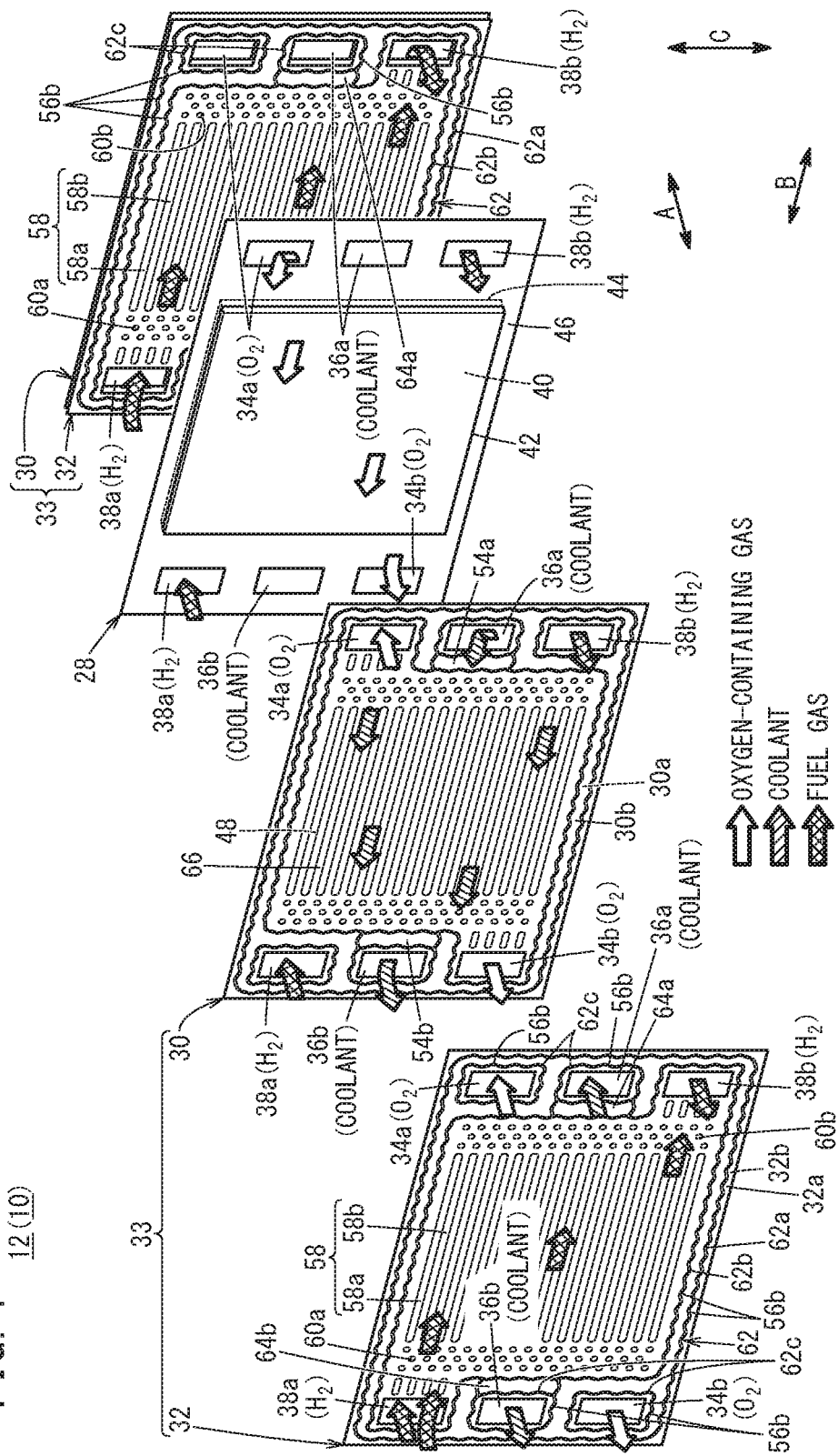
FIG. 4 is an exploded perspective view showing a power generation cell of the fuel cell stack.

As shown in FIGS. 3 and 4, each of the power generation cells 12 is formed by sandwiching a resin film equipped MEA (membrane electrode assembly) 28 between a first metal separator 30 and a second metal separator 32. For example, the first metal separator 30 and the second metal separator 32 are metal plates such as steel plates, stainless steel plates, titanium plate, aluminum plates, plated steel sheets, or metal plates having anti-corrosive surfaces by surface treatment. Each of the first metal separator 30 and the second metal separator 32 is formed by corrugating metal thin plates by press forming to have a corrugated shape in cross section and a wavy shape on the surface. Outer ends of the first metal separator 30 and the second metal separator 32 are joined together by welding, brazing, crimpling, etc. to form a joint separator 33.

At one end of the power generation cell 12 in a long side direction of the power generation cell 12 indicated by an arrow B (horizontal direction in FIG. 4), an oxygen-containing gas supply passage 34a, a coolant supply passage 36a, and a fuel gas discharge passage 38b are arranged in the direction indicated by an arrow C. The oxygen-containing gas supply passage 34a, the coolant supply passage 36a, and the fuel gas discharge passage 38b extend through the power generation cell 12 in the direction indicated by the arrow A. An oxygen-containing gas is supplied through the oxygen-containing gas supply passage 34a. A coolant is supplied through the coolant supply passage 36a, and a fuel gas such as a hydrogen-containing gas is discharged through the fuel gas discharge passage 38b.

At the other end of the power generation cell 12 the direction indicated by the arrow B, a fuel gas supply passage 38a, a coolant discharge passage 36b, and an oxygen-containing gas discharge passage 34b are arranged in the direction indicated by the arrow C. The fuel gas supply passage 38a, the coolant discharge passage 36b, and the oxygen-containing gas discharge passage 34b extend through the power generation cell 12 in the direction indicated by the arrow A. The fuel gas is supplied through the fuel gas supply passage 38a, the coolant is discharged through the coolant discharge passage 36b, and the oxygen-containing gas is discharged through the oxygen-containing gas discharge passage 34b. The positions of the oxygen-containing gas supply passage 34a, the oxygen-containing gas discharge passage 34b, and the fuel gas supply passage 38a, and the fuel gas discharge passage 38b are not limited to the present embodiment, and may be determined as necessary according to the required specification.

As shown in FIG. 3, the resin film equipped MEA 28 has a frame shaped resin film (frame) 46 at its outer portion. For example, the resin film equipped MEA 28 includes a cathode 42, an anode 44, and a solid polymer electrolyte membrane (cation ion exchange membrane) 40 interposed between the cathode 42 and the anode 44. The solid polymer electrolyte membrane 40 is a thin membrane of perfluorosulfonic acid containing water.

A fluorine based electrolyte may be used for the solid polymer electrolyte membrane 40. Alternatively, an HC (hydrocarbon) based electrolyte may be used for the solid polymer electrolyte membrane 40. The plane size (outer size) of the solid polymer electrolyte membrane 40 is smaller than the plane size (outer size) of the cathode 42 and the plane size (outer size) of the anode 44.

The cathode 42 includes a first electrode catalyst layer 42a joined to one surface 40a of the solid polymer electrolyte membrane 40, and a first gas diffusion layer 42b stacked on the first electrode catalyst layer 42a. The outer size of the first electrode catalyst layer 42a is smaller than the outer size of the first gas diffusion layer 42b, and the same as (or smaller than) the outer size of the solid polymer electrolyte membrane 40. It should be noted that the outer size of the first electrode catalyst layer 42a may be the same as the outer size of the solid polymer electrolyte membrane 40, or may be the same as the outer size of the first gas diffusion layer 42b.

The anode 44 includes a second electrode catalyst layer 44a joined to a surface 40b of the solid polymer electrolyte membrane 40, and a second gas diffusion layer 44b stacked on the second electrode catalyst layer 44a. The outer size of the second electrode catalyst layer 44a is smaller than the outer size of the second gas diffusion layer 44b, and the same as (or smaller than) the outer size of the solid polymer electrolyte membrane 40. It should be noted that the outer size of the second electrode catalyst layer 44a may be the same as the outer size of the solid polymer electrolyte membrane 40, or the outer size of the second gas diffusion layer 44b.

The first electrode catalyst layer 42a is formed by depositing porous carbon particles uniformly on the surface of the first gas diffusion layer 42b, and platinum alloy is supported on surfaces of the carbon particles. The second electrode catalyst layer 44a is formed by depositing porous carbon particles uniformly on the surface of the second gas diffusion layer 44b, and platinum alloy is supported on surfaces of the carbon particles. Each of the first gas diffusion layer 42b and the second gas diffusion layer 44b comprises a carbon paper, a carbon cloth, etc.

The resin film 46 having a frame (rectangular ring) shape is sandwiched between an outer front marginal portion of the first gas diffusion layer 42b and an outer front marginal portion of the second gas diffusion layer 44b. An inner end surface of the resin firm 46 is positioned close to, or contacts an outer end surface of the solid polymer electrolyte membrane 40.

As shown in FIG. 4, the oxygen-containing gas supply passage 34a, the coolant supply passage 36a, and the fuel gas discharge passage 38b are provided at one end of the resin film 46 in the direction indicated by the arrow B. The fuel gas supply passage 38a, the coolant discharge passage 36b, and the oxygen-containing gas discharge passage 34b are provided at the other end of the resin film 46 in the direction indicated by the arrow B.

For example, the resin film 46 is made of PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin. It should be noted that the solid polymer electrolyte membrane 40 may protrude outward without using the resin film 46. Further, a pair of frame shaped films may be provided on both sides of the solid polymer electrolyte membrane 40 which protrudes outward.

Figure 5:
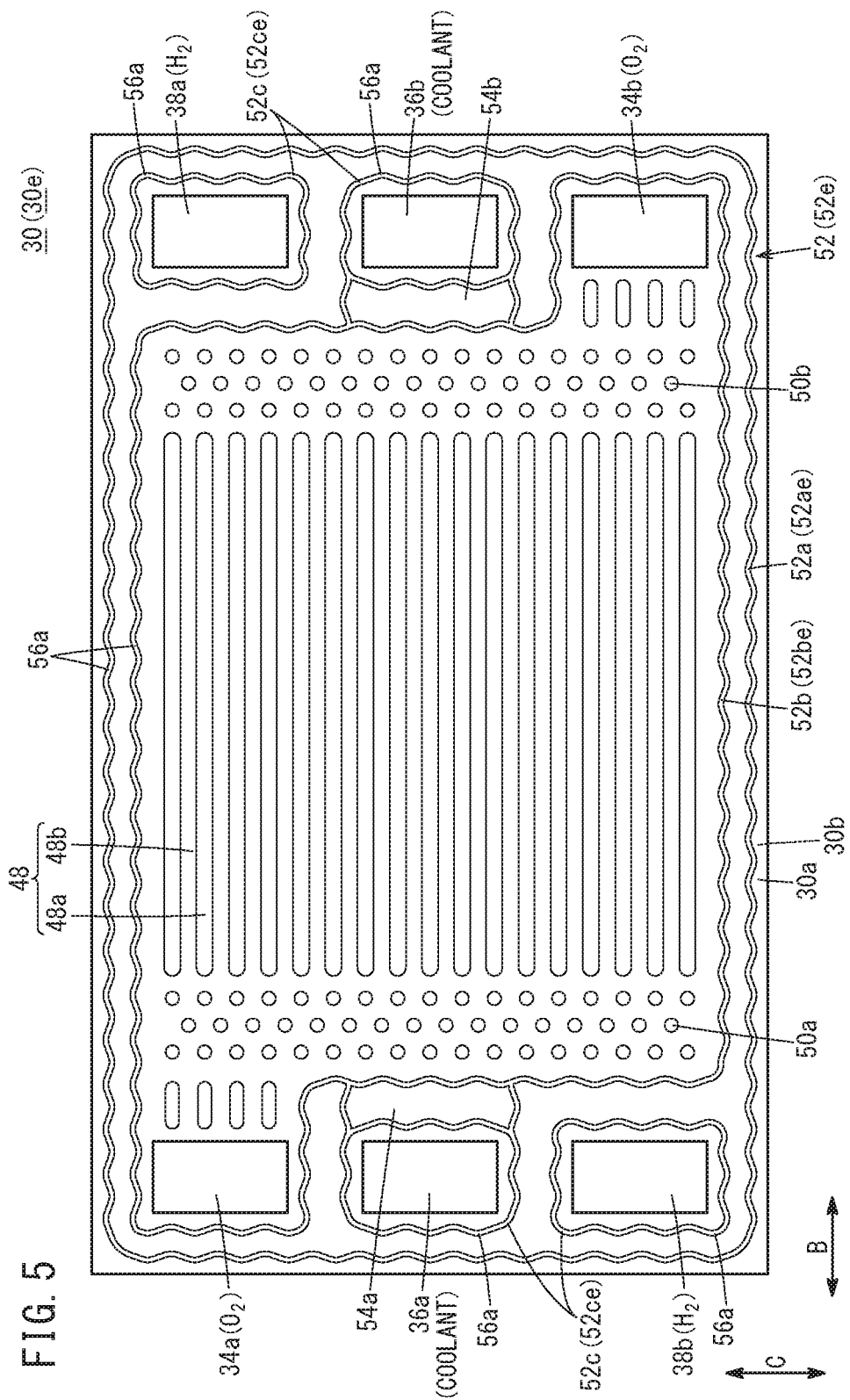
FIG. 5 is a front view showing a first metal separator (first end metal separator)

As shown in FIG. 4, the first metal separator 30 has an oxygen-containing gas flow field 48 on its surface 30a facing the resin film equipped MEA 28. For example, the oxygen-containing gas flow field 48 extends in the direction indicated by the arrow B. As shown in FIG. 5, the oxygen-containing gas flow field 48 is fluidically connected to the oxygen-containing gas supply passage 34a and the oxygen-containing gas discharge passage 34b. That is, the oxygen-containing gas can flow from the oxygen-containing gas supply passage 34a to the oxygen-containing gas flow field 48, and flow from the oxygen-containing gas flow field 48 to the oxygen-containing gas discharge passage 34b. The oxygen-containing gas flow field 48 includes straight flow grooves 48b between a plurality of ridges 48a extending in the direction indicated by the arrow B. Alternatively, the ridges 48a and the flow grooves 48b may extend in a wavy pattern in a plan view viewed in the stacking direction.

An inlet buffer 50a having a plurality of bosses is provided between the oxygen-containing gas supply passage 34a and the oxygen-containing gas flow field 48. An outlet buffer 50b having a plurality of bosses is provided between the oxygen-containing gas discharge passage 34b and the oxygen-containing gas flow field 48.

A first seal line 52 (seal bead) is formed integrally with (or separately from) the oxygen-containing gas flow field 48, the inlet buffer 50a, the outlet buffer 50b each having a corrugated shape in cross section, by pressure forming, on the surface 30a of the first metal separator 30. The first seal line 52 is expanded toward the resin film equipped MEA 28.

As shown in FIG. 3, the first seal line 52 has a narrowed shape in cross section, i.e., the thickness of the first seal line 52 is reduced toward the front end of the first seal line 52. In the illustrated embodiment, the front end of the first seal line 52 has a flat shape. Alternatively, the front end of the first seal line 52 may have an R shape.

Figure 10:
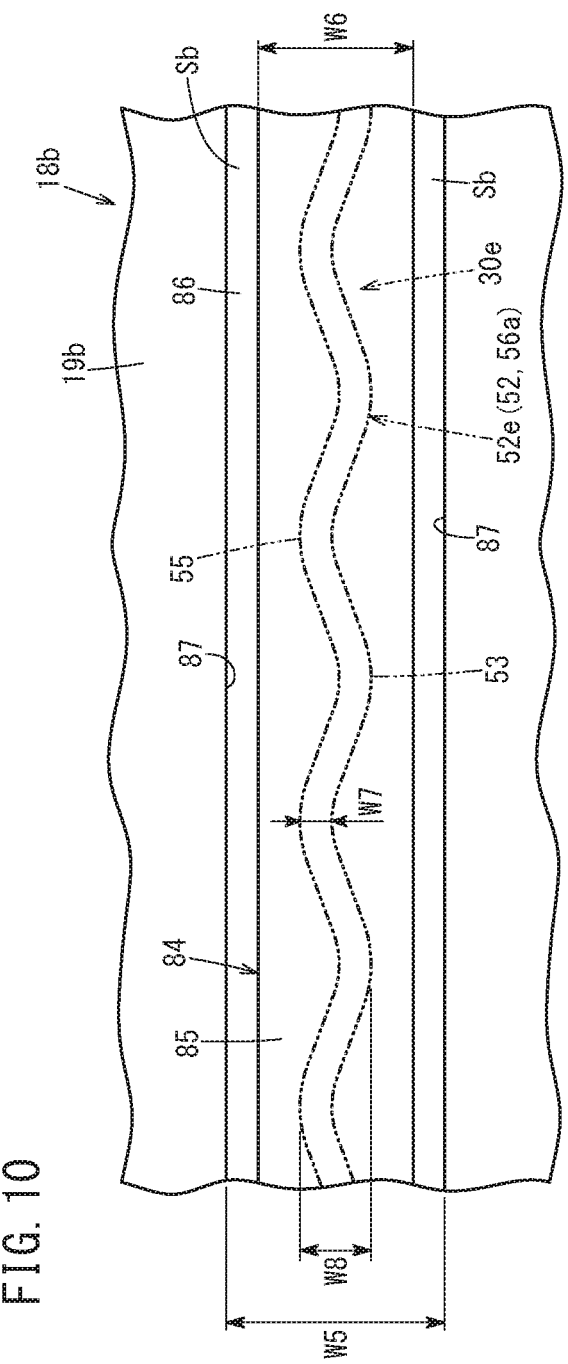
FIG. 10 is a partial enlarged view showing the insulator in FIG. 9.

As shown in FIGS. 5 and 10, the first seal line 52 has a wavy pattern in a plan view viewed in the stack direction. That is, the first seal line 52 includes first protrusions 53 protruding in a direction perpendicular to the direction in which the first seal line 52 extends and second protrusions 55 protruding in a direction opposite to the direction in which the first protrusions 53 protrude.

The protruding end of the first protrusion 53 and the protruding end of the second protrusion 55 are curved in a circular arc shape. The protruding length of the first protrusion 53 and the protruding length of the second protrusion 55 are substantially the same. It should be noted that the protruding length of the first protrusion 53 may be longer than, or smaller than the protruding length of the second protrusion 55. The first seal line 52 has substantially a constant width over the entire length. However, the first seal line 52 may not have the constant width.

In FIG. 5, the first seal line 52 includes an outer bead 52a formed around the outer marginal portion of the surface 30a of the first metal separator 30. Further, the first seal line 52 includes an inner bead 52b formed around the oxygen-containing gas flow field 48, the oxygen-containing gas supply passage 34a, and the oxygen-containing gas discharge passage 34b, while allowing the oxygen-containing gas flow field 48 to be connected to the oxygen-containing gas supply passage 34a and the oxygen-containing gas discharge passage 34b.

Further, the first seal line 52 includes passage beads 52c formed around the fuel gas supply passage 38a, the fuel gas discharge passage 38b, the coolant supply passage 36a, and the coolant discharge passage 36b. The outer bead 52a, the inner bead 52b, and the passage beads 52c protrude from the surface 30a. The outer bead 52a may be provided as necessary. The outer bead 52a may be dispensed with.

An inlet channel 54a is formed between the passage bead 52c around the coolant supply passage 36a and the inner bead 52b. The inlet channel 54a is expanded on the surface 30a side. An outlet channel 54b is formed between the passage bead 52c around the coolant discharge passage 36b and the inner bead 52b. The outlet channel 54b is expanded on the surface 30a side. The inlet channel 54a and the outlet channel 54b are channels connecting the coolant supply passage 36a and the coolant discharge passage 36b to a coolant flow field 66 described later on a surface 30b of the first metal separator 30.

As shown in FIGS. 3 and 5, resin material 56a is fixed to each of protruding front end surfaces of the outer bead 52a and the inner bead 52b, and the passage beads 52c by printing or coating. For example, polyester is used as the resin material 56a. The resin material 56a is fixed to a protruding front surface of the passage bead 52c by printing or coating. Alternatively, as the resin material 56a, punched out sheets having the plane surface shapes of the outer bead 52a, the inner bead 52b, and the passage beads 52c may be attached to the surface 30a of the first metal separator 30. The resin material 56a may be provided as necessary. The resin material 56a may be dispensed with.

Figure 6:
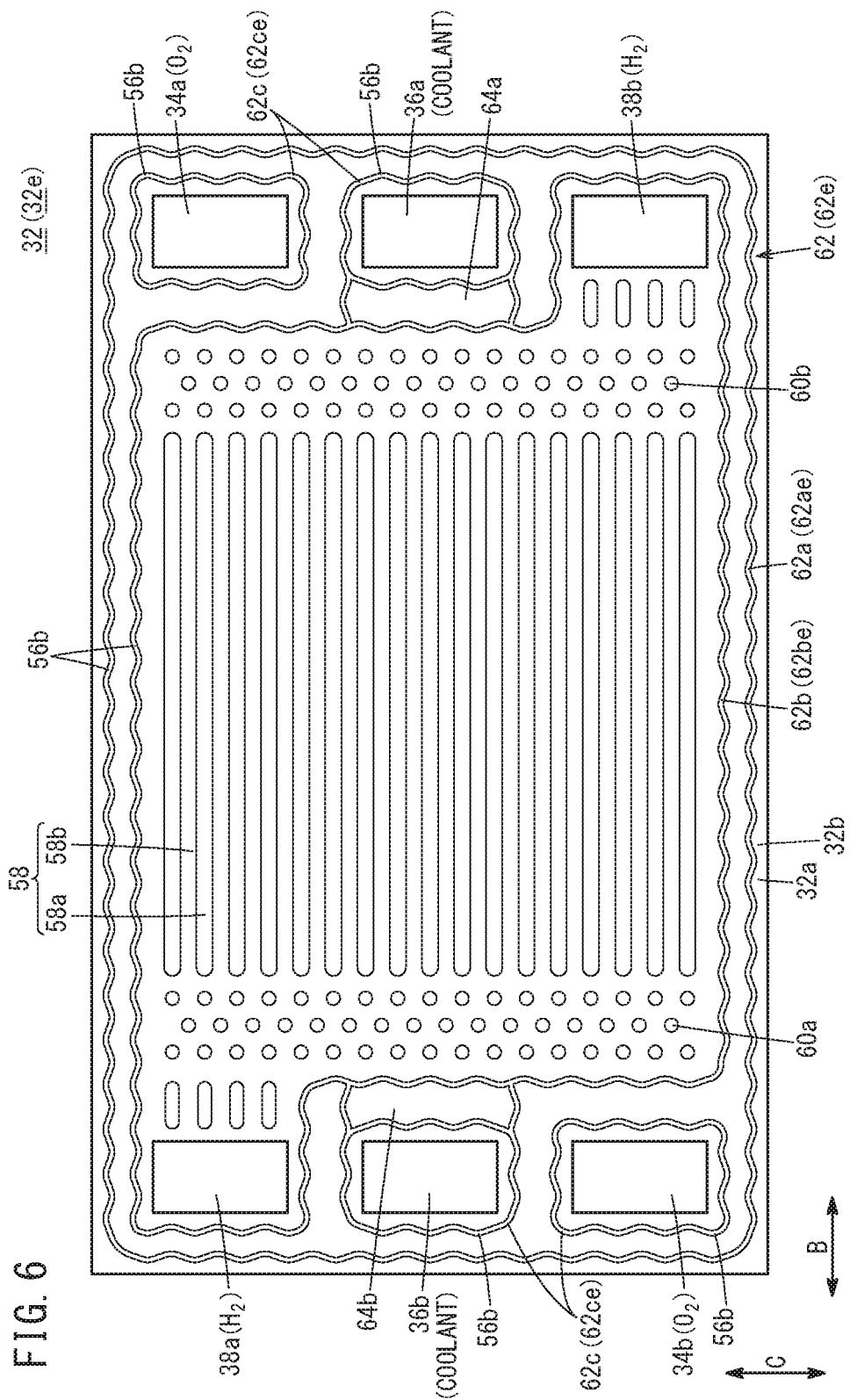
FIG. 6 is a front view showing a second metal separator (second end metal separator)

As shown in FIG. 4, the second metal separator 32 has a fuel gas flow field 58 on its surface 32a facing the resin film equipped MEA 28. For example, the fuel gas flow field 58 extends in the direction indicated by the arrow B. As shown in FIG. 6, the fuel gas flow field 58 is fluidically connected to the fuel gas supply passage 38a and the fuel gas discharge passage 38b. That is, the fuel gas can flow from the fuel gas supply passage 38a to the fuel gas flow field 58, and flow from the fuel gas flow field 58 to the fuel gas discharge passage 38b. The fuel gas flow field 58 includes straight flow grooves 58b between a plurality of ridges 58a extending in the direction indicated by the arrow B. It should be noted that the ridges 58a and the flow grooves 58b extend in a wavy pattern in a plan view viewed in the stacking direction.

An inlet buffer 60a having a plurality of bosses is provided between the fuel gas supply passage 38a and the fuel gas flow field 58. An outlet buffer 60b having a plurality of bosses is provided between the fuel gas discharge passage 38b and the fuel gas flow field 58.

A second seal line 62 (seal bead) is formed integrally with (or separately from) the fuel gas flow field 58, the inlet buffer 60a, the outlet buffer 60b each having a corrugated shape in cross section, by pressure forming, on the surface 32a of the second metal separator 32. The second seal line 62 is expanded toward the resin film equipped MEA 28.

As shown in FIG. 3, the second seal line 62 has a narrowed shape in cross section, i.e., the thickness of the second seal line 62 is reduced toward the front end of the second seal line 62. In the illustrated embodiment, the front end of the second seal line 62 has a flat shape. Alternatively, the front end of the second seal line 62 may have an R shape.

Figure 8:
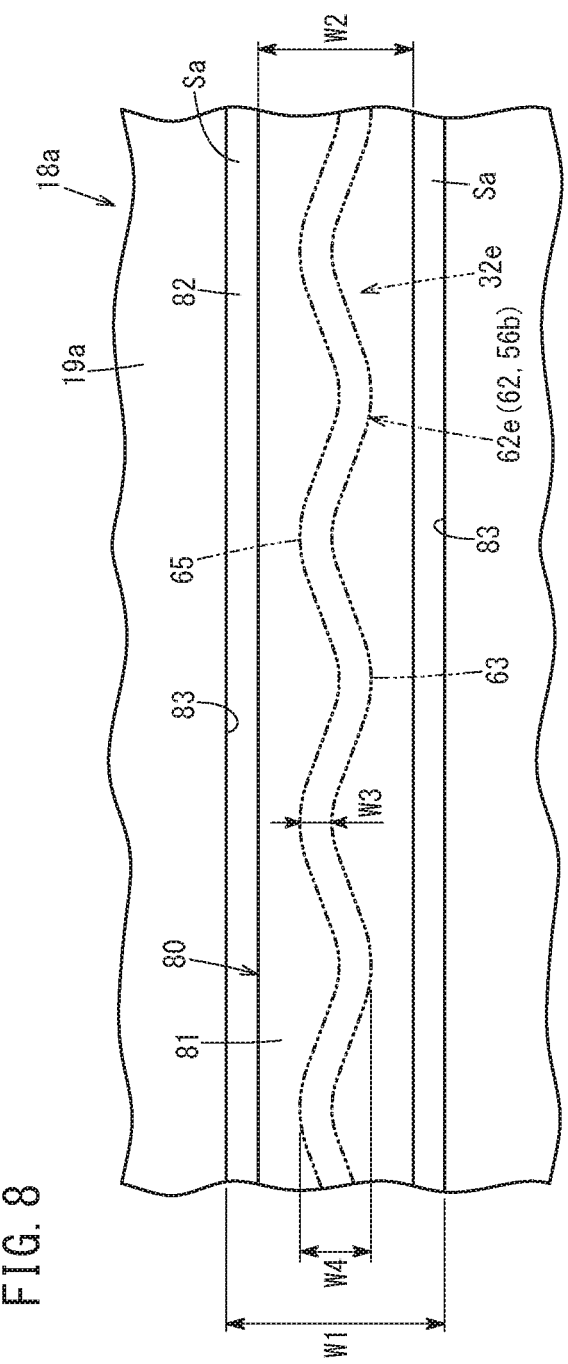
FIG. 8 is a partial enlarged view showing the insulator in FIG. 7.

As shown in FIGS. 6 and 8, the second seal line 62 has a wavy pattern in a plan view viewed in the stack direction. That is, the second seal line 62 includes first protrusions 63 protruding in a direction perpendicular to the direction in which the second seal line 62 extends and second protrusions 65 protruding in a direction opposite to the direction in which the first protrusions 63 protrude.

The protruding end of the first protrusion 63 and the protruding end of the second protrusion 65 are curved in a circular arc shape. The protruding length of the first protrusion 63 and the protruding length of the second protrusion 65 are substantially the same. It should be noted that the protruding length of the first protrusion 63 may be longer than, or smaller than the protruding length of the second protrusion 65. The second seal line 62 is has substantially a constant width over the entire length. However, the second seal line 62 may not have the constant width.

In FIG. 6, the second seal line 62 includes an outer bead 62a formed around the outer marginal portion of the surface 32a of the second metal separator 32. Further, the second seal line 62 includes an inner bead 62b formed around the fuel gas flow field 58, the fuel gas supply passage 38a, and the fuel gas discharge passage 38b, while allowing the fuel gas flow field 58 to be connected to the fuel gas supply passage 38a, and the fuel gas discharge passage 38b.

Further, the second seal line 62 includes passage beads 62c formed around the oxygen-containing gas supply passage 34a, the oxygen-containing gas discharge passage 34b, the coolant supply passage 36a, and the coolant discharge passage 36b. The outer bead 62a, the inner bead 62b, and the passage beads 62c are ridges protruding from the surface 32a of the second metal separator 32. The outer bead 62a may be provided as necessary. The outer bead 62a may be dispensed with.

An inlet channel 64a is formed between the passage bead 62c around the coolant supply passage 36a and the inner bead 62b. The inlet channel 64a is expanded on the surface 32a side. An outlet channel 64b is formed between the passage bead 62c around the coolant discharge passage 36b and the inner bead 62b. The outlet channel 64b is expanded on the surface 32a side. The inlet channel 64a and the outlet channel 64b are channels connecting the coolant supply passage 36a and the coolant discharge passage 36b to the coolant flow field 66 described later on a surface 32b of the second metal separator 32.

As shown in FIGS. 3 and 6, resin material 56b is fixed to each of protruding front end surfaces of the outer bead 62a and the inner bead 62b, and the passage beads 62c by printing or coating. For example, polyester is used as the resin material 56b. Alternatively, as the resin material 56b, punched out sheets having the plane surface shapes of the outer bead 62a, the inner bead 62b, and the passage beads 62c may be attached to the surface 32a of the second metal separator 32. The resin material 56b may be provided as necessary. The resin material 56b may be dispensed with.

As shown in FIG. 4, the coolant flow field 66 is formed between the adjacent first and second metal separators 30, 32 that are joined together, i.e., between the surface 30b of the first metal separator 30 and the surface 32b of the second metal separator 32. The coolant flow field 66 is fluidically connected to the coolant supply passage 36a and the coolant discharge passage 36b. That is, the coolant flow from the coolant supply passage 36a to the coolant flow field 66, and flow from the coolant flow field 66 to the coolant discharge passage 36b. The coolant flow field 66 is formed between the first metal separator 30 and the second metal separator 32 by stacking the back surface of the oxygen-containing gas flow field 48 and the back surface of the fuel gas flow field 58 together.

As shown in FIG. 3, the stack body 14 includes a first end metal separator 30e and a second end metal separator 32e positioned at both ends in the stacking direction (indicated by the arrow A). The second end metal separator 32e is positioned at one end of the stack body 14 in the stacking direction (end where the insulator 18a and the end plate 20a are positioned), and the first end metal separator 30e is positioned at the other end of the stack body 14 in the stacking direction (end where the insulator 18b and the end plate 20b are positioned).

In FIGS. 3 and 5, the first end metal separator 30e has the same structure as the first metal separator 30 which contacts a surface 46a of the resin film 46 of the resin film equipped MEA 28 oriented toward one end in the stacking direction (end where the insulator 18a and the end plate 20a are positioned). Therefore, the detailed description of the first end metal separator 30e is omitted.

In the following description, the first seal line 52, the outer bead 52a, the inner bead 52b, the passage bead 52c of the first end metal separator 30e will be referred to as a "first end seal line 52e", an "outer end bead 52ae", an "inner end bead 52be", and an "passage end bead 52ce", respectively.

In FIGS. 3 and 6, the second end metal separator 32e has the same structure as the second metal separator 32 which contacts a surface 46b of the resin film 46 of the resin film equipped MEA 28 oriented toward other end in the stacking direction (end where the insulator 18b and the end plate 20b are positioned).

In the following description, the second seal line 62, the outer bead 62a, the inner bead 62b, the passage bead 62c of the second end metal separator 32e will be referred to as a "second end seal line 62e", an "outer end bead 62ae", an "inner end bead 62be", and a "passage end bead 62ce", respectively.

The terminal plates 16a, 16b shown in FIG. 2 are made of electrically conductive material. For example, the terminal plates 16a, 16b are made of metal such as copper, aluminum or stainless steel. Terminals 68a, 68b are provided at substantially the centers of the terminal plates 16a, 16b. The terminals 68a, 68b extend outward in the stacking direction.

The terminal 68a is inserted into an insulating cylindrical body 70a. The terminal 68a penetrates through a hole 72a of the insulator 18a and a hole 74a of the end plate 20a, and protrudes to the outside of the end plate 20a. The terminal 68b is inserted into an insulating cylindrical body 70b. The terminal 68b penetrates through a hole 72b of the insulator 18b and a hole 74b of the end plate 20b, and protrudes to the outside of the end plate 20b.

The insulators 18a, 18b are made of insulating material such as polycarbonate (PC) or phenol resin. Recesses 76a, 76b are formed at the centers of the insulators 18a, 18b, respectively. The recesses 76a, 76b are opened to the stack body 14. Holes 72a, 72b are formed at the bottom surfaces of the recesses 76a, 76b, respectively.

The oxygen-containing gas supply passage 34a, the coolant supply passage 36a, and the fuel gas discharge passage 38b extend through one end of the insulator 18a and the end plate 20a in the direction indicated by the arrow B. The fuel gas supply passage 38a, the coolant discharge passage 36b, and the oxygen-containing gas discharge passage 34b extend through the other end of the insulator 18a and the end plate 20a in the direction indicated by the arrow B.

Figure 7:
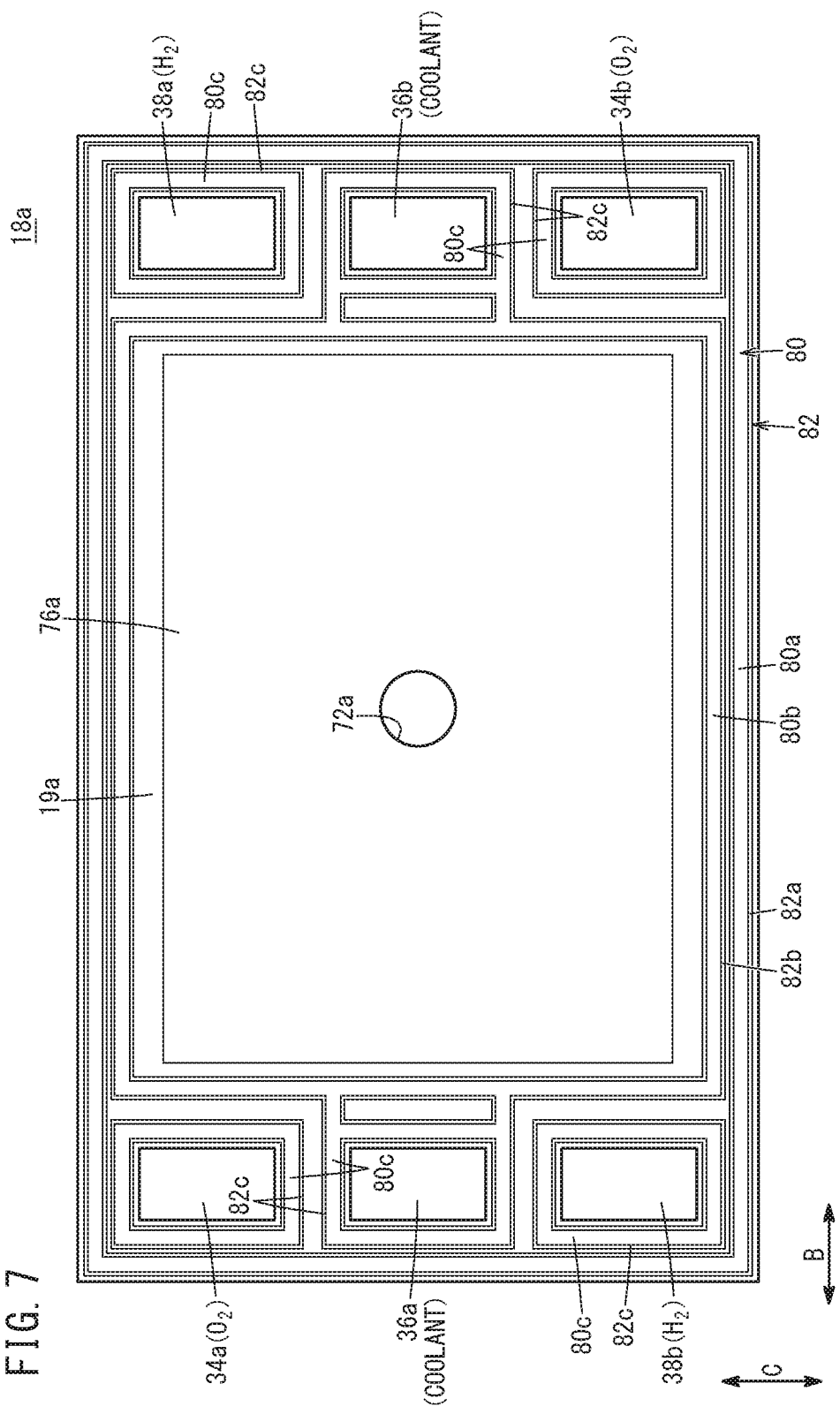
FIG. 7 is a front view showing one of insulators.

As shown in FIGS. 3 and 7, a first recess 82 (an outer recess 82a and an inner recess 82b) is formed on a surface 19a of the insulator 18a facing the stack body 14. A first elastic seal member 80 (an outer seal 80a and an inner seal 80b) is provided in the first recess 82. The first elastic seal member 80 contacts the second end seal line 62e (end seal bead). The outer seal 80a and the inner seal 80b may have different elasticity modulus in the stacking direction. The shape, the dimensions, and the material of the first elastic seal member 80 may be determined suitably to achieve the desired elasticity modulus.

In FIG. 3, a predetermined gap Sa is formed between the first elastic seal member 80 and side surfaces 83 on both sides of the first recess 82 so as to allow the first elastic seal member 80 to be deformed elastically in a direction perpendicular to the stacking direction (direction indicated by the arrow B or C).

Specifically, a width W1 of the first recess 82 is larger than a width W2 of the first elastic seal member 80. The first elastic seal member 80 is spaced from the side surface 83 of the first recess 82 (see FIG. 8). The first elastic seal member 80 is spaced from the side surface 83 of the first recess 82 by a substantially constant distance. The space Sa is provided on each of both sides of the first elastic seal member 80 in the width direction.

For example, the first elastic seal member 80 has a rectangular shape in lateral cross section, and made of elastic polymer material. For example, such polymer material includes a silicone rubber, an acrylic rubber, a nitrile rubber, etc. The first elastic seal member 80 is adhered to a bottom surface 83a of the first recess 82 (by adhesive), or fused to the bottom surface 83a of the first recess 82.

A surface 81 of the first elastic seal member 80 facing the second end seal line 62e is positioned inside the first recess 82 for allowing the second end metal separator 32e to tightly contact the terminal plate 16a. The surface 81 of the first elastic seal member 80 has a flat shape in parallel to the solid polymer electrolyte membrane 40 (surface perpendicular to the stacking direction of the stack body 14).

The first recess 82 and the first elastic seal member 80 extend straight in a plan view viewed in the stacking direction (see FIG. 7). As shown in FIG. 8, the width W2 of the surface 81 of the first elastic seal member 80 is larger than a width W3 (the maximum width) of the front end surface (resin material 56b) of the second end seal line 62e. Further, the width W2 is larger than a distance W4 between the protruding end of the first protrusion 63 and the protruding end of the second protrusion 65. Specifically, preferably, the width W2 is in a range between 120% and 200% of the distance W4.

In FIG. 7, the first recess 82 includes the outer recess 82a formed at a position facing the outer bead 62ae of the second end seal line 62e, the inner recess 82b formed at a position facing the inner end bead 62be of the second end seal line 62e, and passage recesses 82c formed at positions facing the passage beads 62ce of the second end seal line 62e.

The first elastic seal member 80 includes the outer seal 80a provided inside the outer recess 82a, the inner seal 80b provided inside the inner recess 82b, and passage seals 80c provided inside the passage recesses 82c.

That is, the outer seal 80a is formed around the outer recess 82a of the outer marginal portion of the surface 19a of the insulator 18a, and contacts the outer bead 62ae of the second end seal line 62e. The inner seal 80b is formed around the inner recess 82b, and contacts the inner end bead 62be of the second end seal line 62e. The passage seals 80c are formed around portions of the second end metal separator 32e facing the oxygen-containing gas supply passage 34a, the oxygen-containing gas discharge passage 34b, the coolant supply passage 36a, and the coolant discharge passage 36b, and contacts passage end beads 62ce of the second end seal line 62e.

In the embodiment of the present invention, as shown in FIG. 7, the outer seal 80a and the inner seal 80b are provided as separate members. Portions of the passage seals 80c around the coolant supply passage 36a and the coolant discharge passage 36b are formed separately from the outer seal 80a, and integrally with the inner seal 80b.

Portions of the passage seal 80c around the oxygen-containing gas supply passage 34a and the oxygen-containing gas discharge passage 34b are formed separately from the outer seal 80a and the inner seal 80b.

It should be noted that the outer recess 82a, the inner recess 82b, and the passage recesses 82c may be connected together, and the outer seal 80a, the inner seal 80b, and the passage seals 80c may be formed integrally. Further, the outer seal 80a and the outer recess 82a may be provided as necessary. The outer seal 80a and the outer recess 82a may be dispensed with.

Figure 9:
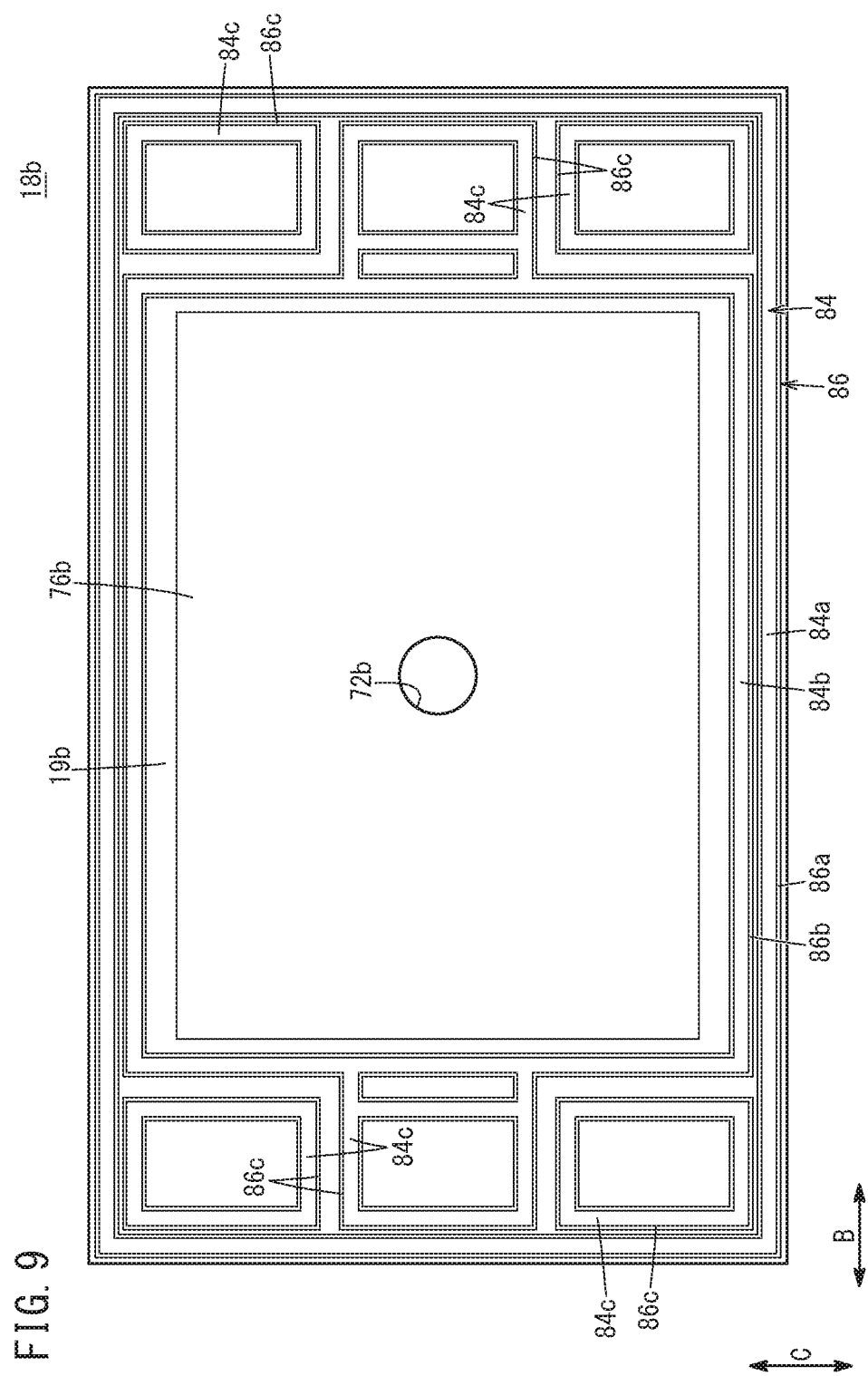
FIG. 9 is a front view showing the other of the insulators.

As shown in FIGS. 3 and 9, a second recess 86 (an outer recess 86a and an inner recess 86b) is formed on a surface 19b of the insulator 18b facing the stack body 14. A second elastic seal member 84 (an outer seal 84a and an inner seal 84b) is provided in the second recess 86. The second elastic seal member 84 contacts the first end seal line 52e (end seal bead). The outer seal 84a and the inner seal 84b may have different elasticity modulus in the stacking direction. The shape, the dimensions, and the material of the second elastic seal member 84 may be determined suitably to achieve the desired elasticity modulus.

In FIG. 3, a predetermined gap Sb is formed between the second elastic seal member 84 and side surfaces 87 on both sides of the second recess 86 so as to allow the second elastic seal member 84 to be deformed elastically in a direction perpendicular to the stacking direction (direction indicated by the arrow B or C).

Specifically, the width W5 of the second recess 86 is larger than the width W6 of the second elastic seal member 84. The second elastic seal member 84 is spaced from the side surface 87 of the second recess 86 (FIG. 10). The second elastic seal member 84 is spaced from the side surface 87 of the second recess 86 by a substantially constant distance. The space Sb is provided on each of both sides of the second elastic seal member 84 in the width direction.

For example, the second elastic seal member 84 has a rectangular shape in lateral cross section, and made of elastic polymer material. Examples of such polymer material include a silicone rubber, an acrylic rubber, a nitrile rubber, etc. The second elastic seal member 84 is adhered to a bottom surface 87a of the second recess 86 (by adhesive), or fused to the bottom surface 87a of the second recess 86.

A surface 85 of the second elastic seal member 84 facing the first end seal line 52e is positioned inside the second recess 86 for allowing the first end metal separator 30e to tightly contact the terminal plate 16b. The surface 85 of the second elastic seal member 84 has a flat shape in parallel to the solid polymer electrolyte membrane 40 (surface perpendicular to the stacking direction of the stack body 14).

The second recess 86 and the second elastic seal member 84 extend straight in a plan view viewed in the stacking direction (see FIG. 9). As shown in FIG. 10, a width W6 of the surface 85 of the second elastic seal member 84 is larger than a width W7 (the maximum width) of the front end surface (resin material 56a) of the first end seal line 52e. Further, the width W6 is larger than a distance W8 between the protruding end of the first protrusion 53 and the protruding end of the second protrusion 55. Specifically, it is preferable that the width W6 is in a range between 120% and 200% of the distance W8.

In FIG. 9, the second recess 86 includes the outer recess 86a formed at a position facing the outer end bead 52ae of the first end seal line 52e, the inner recess 86b formed at a position facing the inner end bead 52be of the first end seal line 52e, and passage recesses 86c formed at positions facing the passage end beads 52ce of the first end seal line 52e.

The second elastic seal member 84 includes the outer seal 84a provided inside the outer recess 86a, the inner seal 84b provided inside the inner recess 86b, and passage seals 84c provided inside the passage recesses 86c.

That is, the outer seal 84a is formed around the outer recess 86a of the outer marginal portion of the surface 19b of the insulator 18b, and contacts the outer end bead 52ae of the first end seal line 52e. The inner seal 84b is formed around the inner recess 86b, and contacts the inner end bead 52be of the first end seal line 52e. The passage seals 84c are formed around portions of the first end metal separator 30e facing the fuel gas supply passage 38a, the fuel gas discharge passage 38b, the coolant supply passage 36a, and the coolant discharge passage 36b, and contacts passage end beads 52ce of the first end seal line 52e.

In the embodiment of the present invention, as shown in FIG. 9, the outer seal 84a and the inner seal 84b are provided as separate members. Portions of the passage seal 84c around the coolant supply passage 36a and the coolant discharge passage 36b of the first end metal separator 30e are formed separately from the outer seal 84a, and integrally with the inner seal 84b.

Portions of the passage seals 84c around the fuel gas supply passage 38a and the fuel gas discharge passage 38b of the first end metal separator 30e are formed separately from the outer seal 84a and the inner seal 84b.

It should be noted that the outer recess 86a, the inner recess 86b, and the passage recesses 86c may be connected together, and the outer seal 84a, the inner seal 84b, and the passage seals 84c may be formed integrally in one piece. Further, the outer seal 84a and the outer recess 86a may be provided as necessary. The outer seal 84a and the outer recess 86a may be dispensed with.

In the fuel cell stack 10, by fixing the coupling bars 24 to the inner surfaces of the end plates 20a, 20b using bolts 26 in a manner that the first seal line 52 and the second seal line 62 are deformed elastically, a tightening load in the stacking direction is applied to the stack body 14. Therefore, the first seal line 52 and the second seal line 62 are deformed elastically in a manner that the resin film 46 is sandwiched between the first seal line 52 and the second seal line 62 in the stacking direction. That is, since the elastic force of the first seal line 52 and the elastic force of the second seal line 62 are applied to the resin film 46, leakage of the oxygen-containing gas, the fuel gas, and the coolant does not occur.

Next, operation of the fuel cell stack 10 having the above structure will be described below.

Firstly, as shown in FIG. 1, an oxygen-containing gas such as the air is supplied to the oxygen-containing gas supply passage 34a at the end plate 20a. A fuel gas such as a hydrogen-containing gas is supplied to the fuel gas supply passage 38a at the end plate 20a. A coolant such as pure water, ethylene glycol or oil is supplied to the coolant supply passage 36a at the end plate 20a.

As shown in FIG. 4, the oxygen-containing gas flows from the oxygen-containing gas supply passage 34a to the oxygen-containing gas flow field 48 at the first metal separator 30. The oxygen-containing gas flows along the oxygen-containing gas flow field 48 in the direction indicated by the arrow B, and the oxygen-containing gas is supplied to the cathode 42 of the membrane electrode assembly 28.

In the meanwhile, the fuel gas is supplied from the fuel gas supply passage 38a to the fuel gas flow field 58 of the second metal separator 32. The fuel gas flows along the fuel gas flow field 58 in the direction indicated by the arrow B, and the fuel gas is supplied to the anode 44 of the membrane electrode assembly 28.

Thus, in each of the membrane electrode assemblies 28, the oxygen-containing gas supplied to the cathode 42 and the fuel gas supplied to the anode 44 are partially consumed in the electrochemical reactions in the second electrode catalyst layer 44a and the first electrode catalyst layer 42a of the cathode 42 and the anode 44 for generating electricity.

Then, after the oxygen-containing gas supplied to the cathode 42 is partially consumed at the cathode 42, the oxygen-containing gas flows along the oxygen-containing gas discharge passage 34b, and the oxygen-containing gas is discharged in the direction indicated by the arrow A. Likewise, after the fuel gas supplied to the anode 44 is partially consumed at the anode 44, the fuel gas flows along the fuel gas discharge passage 38b, and the fuel gas is discharged in the direction indicated by the arrow A.

Further, the coolant supplied to the coolant supply passage 36a flows into the coolant flow field 66 formed between the first metal separator 30 and the second metal separator 32. Then, the coolant flows in the direction indicated by the arrow B. After the coolant cools the membrane electrode assembly 28, the coolant is discharged from the coolant discharge passage 36b.

In this case, the fuel cell stack 10 according to the embodiment of the present invention offers the following advantages.

In the outer portions of the insulators 18a, 18b or the end plates 20a, 20b, the seal members (the first elastic seal member 80 and the second elastic seal member 84) which contact the end seal beads (the first end seal line 52e and the second end seal line 62e) are provided. The widths W2, W6 of the seal members (the first elastic seal member 80 and the second elastic seal member 84) are larger than the maximum widths W3, W7 of the end seal beads (the first end seal line 52e and the second end seal line 62e).

In the structure, since the seal members (the first elastic seal member 80 and the second elastic seal member 84) can be brought in contact with the end seal beads (the first end seal line 52e and the second end seal line 62e), it is possible to achieve the desired seal performance at the ends of the stack body 14 in the stacking direction.

In this regard, in the case where the first elastic seal member 80 and the second elastic seal member 84 are not provided, the elastic force of the second end seal line 62e is applied to the insulator 18a only from one side, and the elastic force of the first end seal line 52e is applied to the insulator 18b only from one side. Therefore, the desired seal performance at the ends of the stack body 14 in the stacking direction may not be achieved.

However, the insulator 18a is provided with the first elastic seal member 80 which contacts the second end seal line 62e of the second end metal separator 32e. In the structure, the elastic force of the first elastic seal member 80 is applied to the second end seal line 62e, and the elastic force of the second end seal line 62e is applied to the first elastic seal member 80.

The insulator 18b is provided with the second elastic seal member 84 which contacts the first end seal line 52e of the first end metal separator 30e. In the structure, the elastic force of the second elastic seal member 84 is applied to the first end seal line 52e, and the elastic force of the first end seal line 52e is applied to the second elastic seal member 84. Thus, it is possible to improve the seal performance at both ends of the stack body 14 in the stacking direction.

The first seal line 52, the first end seal line 52e, the second seal line 62, and the second end seal line 62e extend in a wavy pattern in a plan view viewed in the stacking direction. Therefore, in comparison with the case where these seal lines extend in straight, the rigidity is improved in each of the first seal line 52, the first end seal line 52e, the second seal line 62, and the second end seal line 62e.

In this manner, since the relative decrease in the seal surface pressure is suppressed in each of the first seal line 52, the first end seal line 52e, the second seal line 62, and the second end seal line 62e, it is possible to suppress variation in the seal surface pressure.

The width W2 of the first elastic seal member 80 is larger than the width W3 (maximum width) of the second end seal line 62e (see FIG. 8). In the structure, it is possible to reliably bring the front end surface (resin material 56b) of the second end seal line 62e into contact with the first elastic seal member 80. The width W6 of the second elastic seal member 84 is larger than the width W7 (maximum width) of the first end seal line 52e (see FIG. 10). In the structure, it is possible to reliably bring the front end surface (resin material 56a) of the first end seal line 52e into contact with the second elastic seal member 84.

The second end seal line 62e includes the first protrusions 63 protruding in the direction perpendicular to the direction in which the second end seal line 62e extends, and the second protrusions 65 protruding in the direction opposite to the protruding direction of the first protrusions 63. The width W2 of the first elastic seal member 80 is larger than the distance W4 between the protruding end of the first protrusion 63 and the protruding end of the second protrusion 65 (see FIG. 8). In the structure, it is possible to more reliably bring the front end surface of the second end seal line 62e into contact with the first elastic seal member 80.

The first end seal line 52e includes the first protrusions 53 protruding in the direction perpendicular to the direction in which the first end seal line 52e extends, and the second protrusions 55 protruding in the direction opposite to the protruding direction of the first protrusions 53. The width W6 of the second elastic seal member 84 is larger than the distance W8 between the protruding end of the first protrusion 53 and the protruding end of the second protrusion 55 (see FIG. 10). In the structure, it is possible to more reliably bring the front end surface of the first end seal line 52e into contact with the second elastic seal member 84 more reliably.

The first recess 82 is formed in the surface 19a of the insulator 18a to provide the first elastic seal member 80 in the first recess 82, and the second recess 86 is formed in the surface 19b of the insulator 18b to provide the second elastic seal member 84 in the second recess 86. In the structure, it is possible to reduce the size of the stack body 14 in the stacking direction.

The first seal line 52 and the first end seal line 52e are provided around the oxygen-containing gas flow field 48, and around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b. In the structure, it is possible to reliably prevent leakage of the reactant gases (oxygen-containing gas and fuel gas) and the coolant.

The second seal line 62 and the second end seal line 62e are provided around the fuel gas flow field 58, and around the fuel gas supply passage 38a, the fuel gas discharge passage 38*b*, the oxygen-containing gas supply passage 34*a*, the oxygen-containing gas discharge passage 34*b*, the coolant supply passage 36*a*, and the coolant discharge passage 36*b*. In the structure, it is possible to reliably prevent leakage of the reactant gases (oxygen-containing gas and the fuel gas) and the coolant.

In the embodiment of the present invention, the first end metal separator 30*e* has the same structure as the first metal separator 30, and the second end metal separator 32*e* has the same structure as the second metal separator 32. That is, since no dedicated component parts are required for the first end metal separator 30*e* and the second end metal separator 32*e*, it is possible to reduce the types of component parts of the fuel cell stack 10, and achieve reduction in the number of production steps of the fuel cell stack 10.

For example, when power generation of the fuel cell stack 10 is started, the temperature of the fuel cell stack 10 is increased. When power generation of the fuel cell stack 10 is stopped, the temperature of the fuel cell stack 10 is decreased. In general, the difference between the linear expansion coefficient of the joint separator 33 and the linear expansion coefficient of the insulators 18*a*, 18*b* is relatively large.

Figure 11:
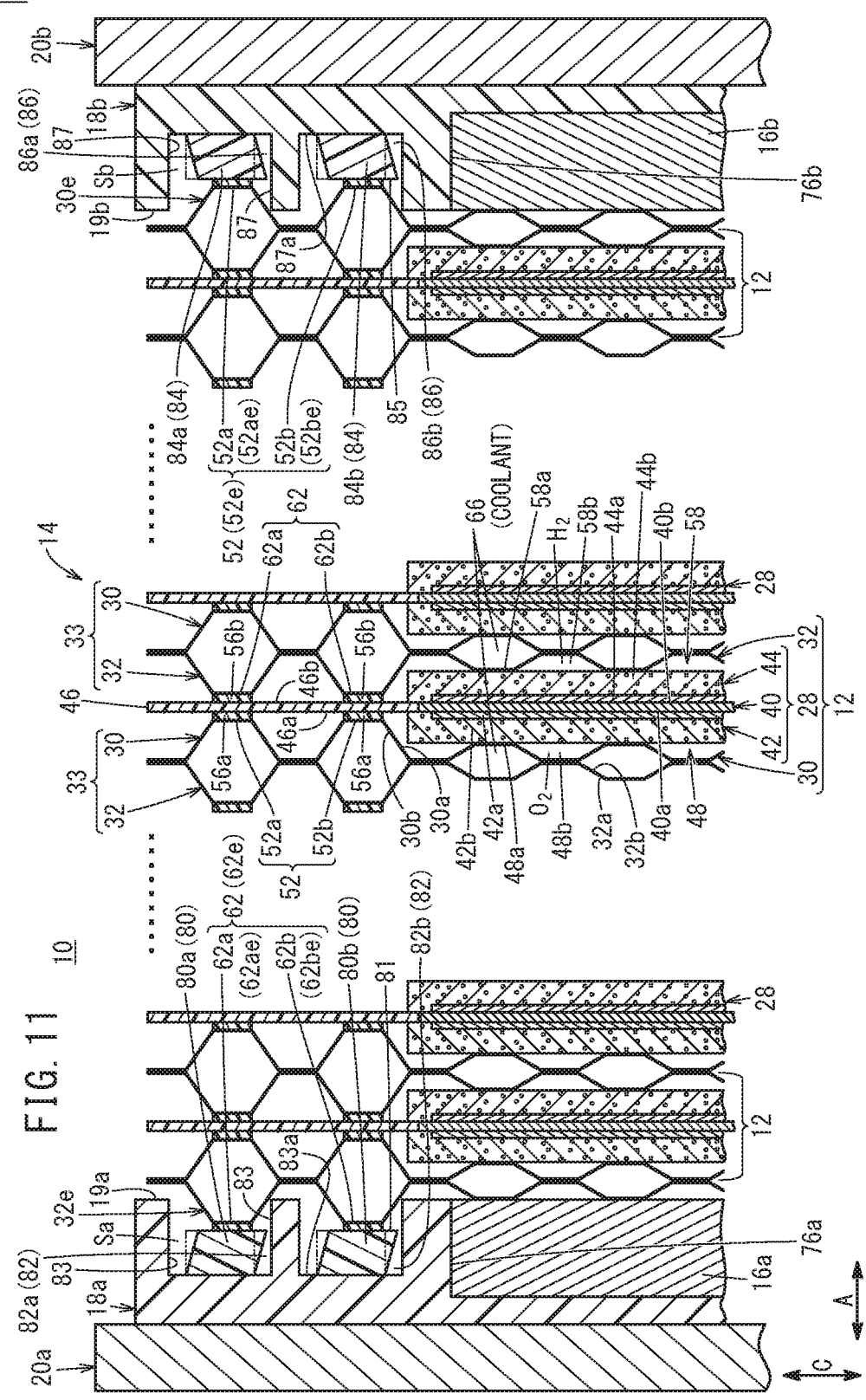
FIG. 11 is a cross sectional view showing a first elastic seal member and a second elastic seal member of the fuel cell stack.

However, in the embodiment of the present invention, the second end seal line 62*e* does not contact the insulator 18*a*, but contacts the first elastic seal member 80. Therefore, for example, as shown in FIG. 11, even in the case where the positional relationship between the insulator 18*a* and the second end seal line 62*e* is displaced in the direction indicated by the arrow C due to heat expansion or heat contraction, since the first elastic seal member 80 is deformed elastically, it is possible to suppress displacement of the contact position between the second end seal line 62*e* and the first elastic seal member 80.

Likewise, the first end seal line 52*e* does not contact the insulator 18*b*, but contacts the second elastic seal member 84. Therefore, for example, even if the positional relationship between the insulator 18*b* and the first end seal line 52*e* is displaced in the direction indicated by the arrow C due to heat expansion or heat contraction, since the second elastic seal member 84 is deformed elastically, it is possible to suppress displacement of the contact position between the first end seal line 52*e* and the second elastic seal member 84. Thus, it is possible to suppress decrease in the sealing performance at the end of the stack body 14 in the stacking direction due to the change in the temperature of the fuel cell stack 10.

It should be noted that the positional displacement of the first end seal line 52*e* and the second end seal line 62*e* from the insulators 18*a*, 18*b* may occur also, e.g., in the case where vibrations and/or loads are applied to the fuel cell stack 10 in a direction perpendicular to the stacking direction.

Further, the predetermined gap Sa is formed between the first elastic seal member 80 and the side surface 83 of the first recess 82, and the predetermined gap Sb is formed between the second elastic seal member 84 and the side surface 87 of the second recess 86. In the structure, the first elastic seal member 80 and the second elastic seal member 84 can be deformed elastically, easily and reliably.

Further, since the surface 81 of the first elastic seal member 80 facing the stack body 14 has the flat shape, it is possible to efficiently bring the second end seal line 62*e* into contact with the surface 81 of the first elastic seal member 80 tightly. Further, since the surface 85 of the second elastic seal member 84 facing the stack body 14 has the flat shape, it is possible to efficiently bring the first end seal line 52*e* into contact with the surface 85 of the second elastic seal member 84 tightly.

The present invention is not limited to the above structure. For example, the first elastic seal member 80 may be provided on the surface 19*a* of the insulator 18*a*, and the second elastic seal member 84 may be provided on the surface 19*b* of the insulator 18*b*. In this case, since there is no need to provide the first recess 82 and the second recess 86, it is possible to simplify the structure of the insulators 18*a*, 18*b*.

Figure 12:
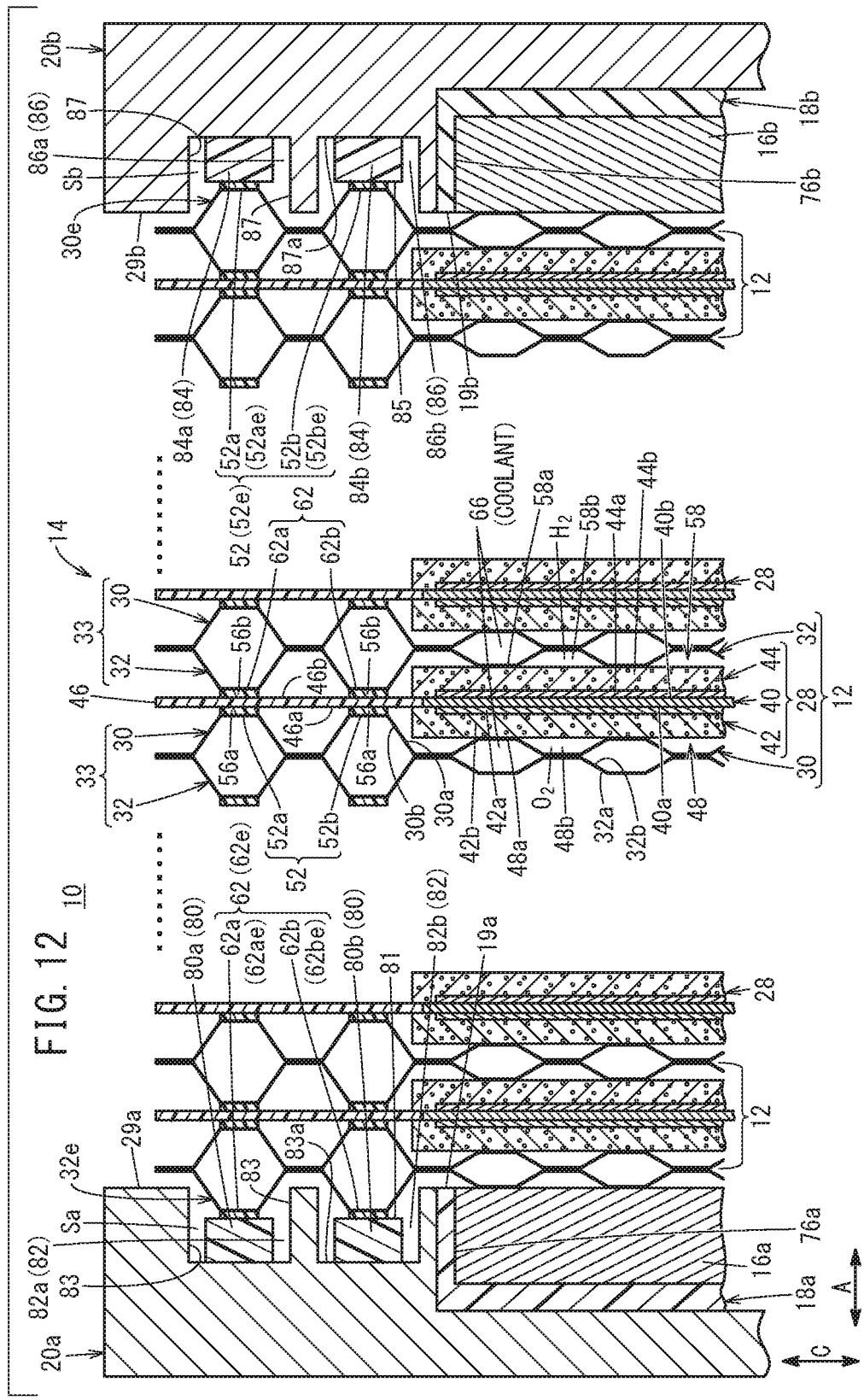
FIG. 12 is a cross sectional view showing an example of structure of the fuel cell stack according to the present invention.

Further, in the above described embodiment, the first elastic seal member 80 is provided for the insulator 18*a*, and the second elastic seal member 84 is provided for the insulator 18*b*. However, as shown in FIG. 12, in the case where the insulators 18*a*, 18*b* are slightly smaller than the joint separator 33, the first elastic seal member 80 may be provided in the first recess 82 of the end plate 20*a*, and the second elastic seal member 84 may be provided in the second recess 86 of the end plate 20*b*.

It should be noted that the first elastic seal member 80 may be provided on a surface 29*a* of the end plate 20*a* and the second elastic seal member 84 may be provided on a surface 29*b* of the end plate 20*b*. In this case, it is possible to simplify the structure of the end plates 20*a*, 20*b*.

In the above described embodiment, the first seal line 52 protruding in the stacking direction of the stack body 14 is formed on the first metal separator 30 in a manner that the first seal line 52 contacts the resin film 46. The second seal line 62 protruding in the stacking direction of the stack body 14 is formed on the second metal separator 32 in a manner that the second seal line 62 contacts the resin film 46.

Figure 13:
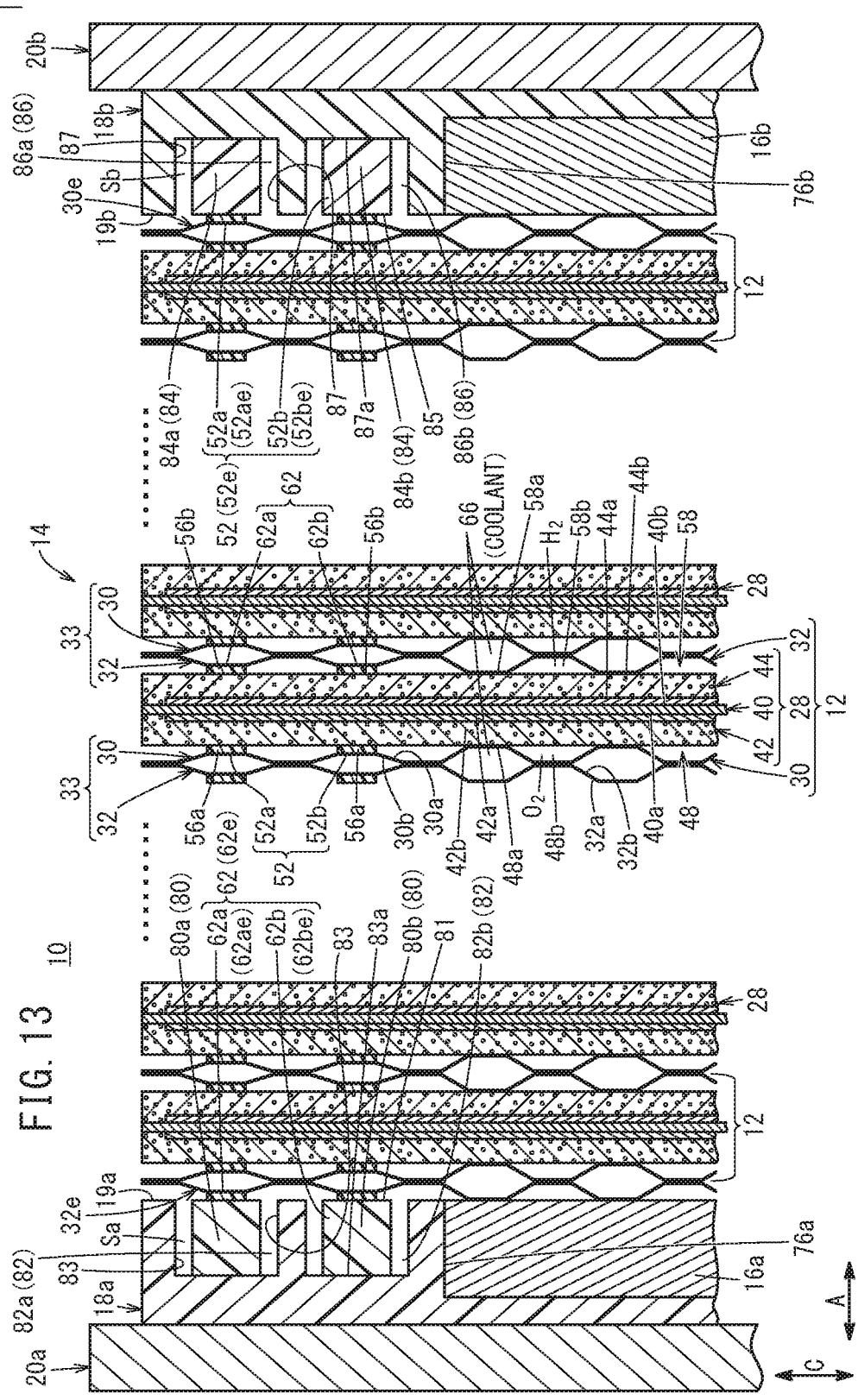
FIG. 13 is a cross sectional view showing another example of structure of the fuel cell stack according to the present invention.

However, in the present invention, as shown in FIG. 13, the first and second seal lines 52, 62 may be provided to contact the outer end of the membrane electrode assembly 28 which does not have the resin film 46.

Figure 14:
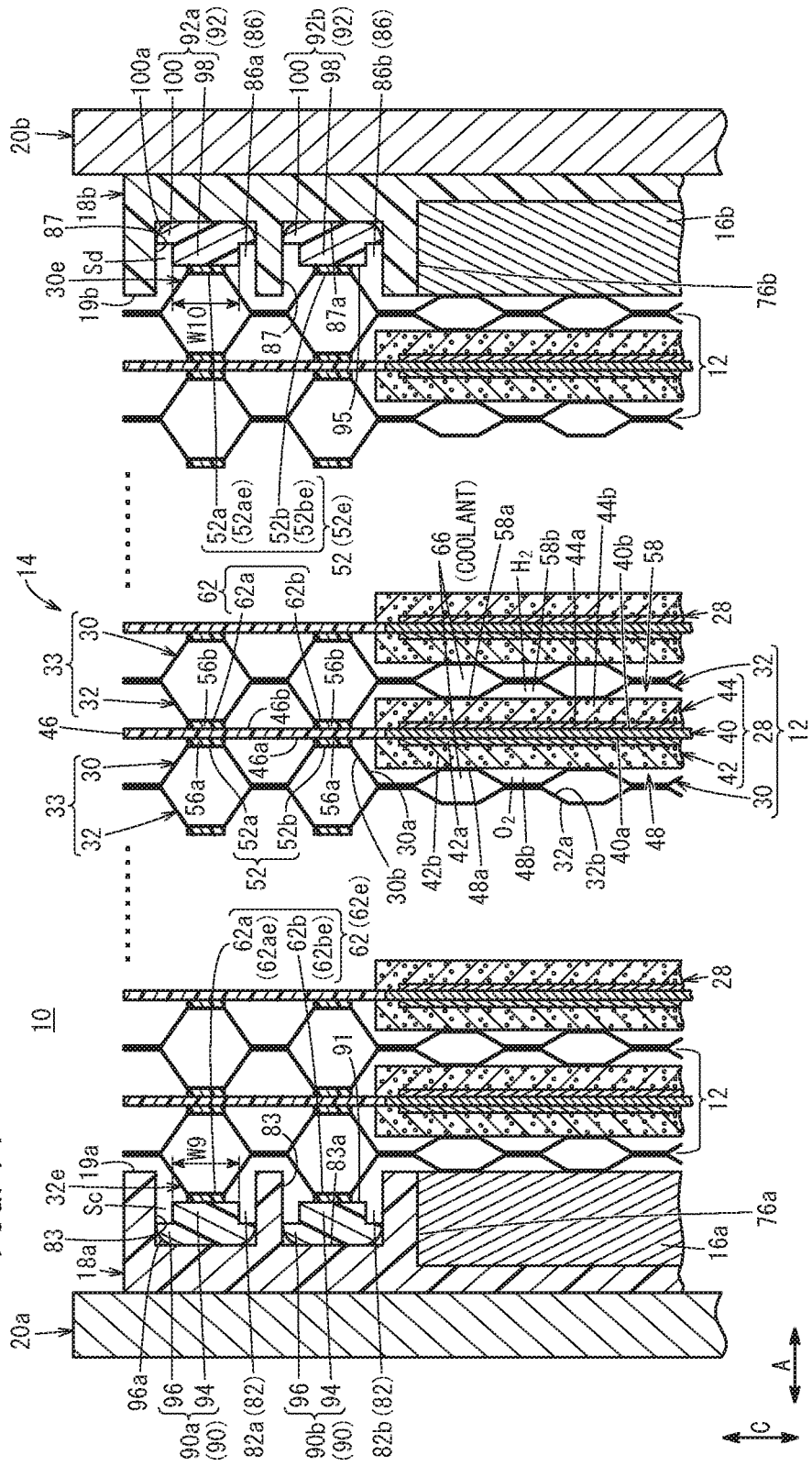
FIG. 14 is a cross sectional view showing still another example of structure of the fuel cell stack according to the present invention.

As shown in FIG. 14, as seal members, the fuel cell stack 10 may have a first elastic seal member 90 and a second elastic seal member 92, instead of the first elastic seal member 80 and the second elastic seal member 84 described above. As in the case of the first elastic seal member 80, the first elastic seal member 90 includes an outer seal 90*a*, an inner seal 90*b*, and passage seals (not shown). As in the case of the second elastic seal member 84, the second elastic seal member 92 includes an outer seal 92*a*, an inner seal 92*b*, and passage seals (not shown).

The first elastic seal member 90 is made of elastic polymer material. The polymer material as used in the above first elastic seal member 80 may be used in the first elastic seal member 90. The first elastic seal member 90 includes a seal body 94 which contacts the second end seal line 62*e*, and a fixed portion 96 provided for the seal body 94.

The seal body 94 has a rectangular shape in lateral cross section. A predetermined gap Sc is formed between the seal body 94 and the side surfaces 83 on both sides of the first recess 82 so as to allow the seal body 94 to be deformed elastically in a direction perpendicular to the stacking direction (direction indicated by the arrow B or C). Stated otherwise, the seal body 94 is spaced from both side surfaces 83 of the first recess 82. The distance between the seal body 94 and the side surfaces 83 is substantially constant in the direction in which the first elastic seal member 90 extends. The gap Sc is provided on both sides of the seal body 94 in the width direction.

A surface 91 of the seal body 94 facing the second end seal line 62*e* is positioned inside the first recess 82. The surface 91 of the seal body 94 has a flat shape in parallel with the solid polymer electrolyte membrane 40.

A width W9 of the surface 91 of the seal body 94 is the same as the width W2 of the surface 81 of the above described first elastic seal member 80 (see FIG. 8). That is, the width W9 is larger than the width W3 (maximum width, see FIG. 8) of the front end surface (resin material 56b) of the second end seal line 62e. The width W9 is larger than the distance W4 between the protruding end of the first protrusion 63 and the protruding end of the second protrusion 65 (see FIG. 8).

The fixed portion 96 is provided integrally with the seal body 94, on the side opposite to the stack body 14. The fixed portion 96 contacts the side surfaces 83 on both sides of the first recess 82. Stated otherwise, the fixed portion 96 is sandwiched between the side surfaces 83 on both sides of the first recess 82. Thus, it is possible to suppress positional displacement of the first elastic seal member 90 from the first recess 82 in the width direction. Further, at the time of producing the fuel cell stack 10, it is possible to suppress detachment of the first elastic seal member 90 from the first recess 82.

The fixed portion 96 includes a curved surface 96a protruding toward the bottom surface 83a of the first recess 82 in a ridge shape. The curved surface 96a partially contacts the bottom surface 83a of the first recess 82. It should be noted that the curved surface 96a and the bottom surface 83a of the first recess 82 are not adhered together, or melted together. However, the curved surface 96a may be partially adhered to (by adhesive) or melted to the bottom surface 83a of the first recess 82. In this case, it is possible to suppress positional displacement of the first elastic seal member 90 from the first recess 82 in the width direction, to a greater extent. Further, at the time of producing the fuel cell stack 10, it is possible to suppress detachment of the first elastic seal member 90 from the first recess 82 to a greater extent.

The second elastic seal member 92 is made of elastic polymer material. The polymer material as used in the above first elastic seal member 90 may be used in the second elastic seal member 92. The second elastic seal member 92 includes a seal body 98 which contacts the first end seal line 52e, and a fixed portion 100 provided for the seal body 98.

The seal body 98 has a rectangular shape in lateral cross section. A predetermined gap Sd is formed between the seal body 98 and the side surfaces 87 on both sides of the second recess 86 so as to allow the seal body 98 to be deformed elastically in a direction perpendicular to the stacking direction (direction indicated by the arrow B or C). Stated otherwise, the seal body 98 is spaced from both side surfaces 87 of the second recess 86. The distance between the seal body 98 and the side surfaces 87 is substantially constant in the direction in which the second elastic seal member 92 extends. The gap Sd is provided on both sides of the seal body 98 in the width direction.

A surface 95 of the first end seal line 52e of the seal body 98 is positioned inside the second recess 86. The surface 95 of the seal body 98 has a flat shape in parallel to the solid polymer electrolyte membrane 40.

A width W10 of the surface 95 of the seal body 98 is the same as the width W6 of the surface 85 of the above described second elastic seal member 84 (see FIG. 10). That is, the width W10 is larger than the width W7 (maximum width, see FIG. 10) of the front end surface (resin material 56a) of the first end seal line 52e. The width W10 is larger than the distance W8 between the protruding end of the first protrusion 53 and the protruding end of the second protrusion 55 (see FIG. 10).

The fixed portion 100 is provided integrally with the seal body 98, on the side opposite to the stack body 14. The fixed portion 100 contacts the side surfaces 87 on both sides of the second recess 86. Stated otherwise, the fixed portion 100 is held between the side surfaces 87 on both sides of the second recess 86. Thus, it is possible to suppress positional displacement of the second elastic seal member 92 from the second recess 86 in the width direction. Further, at the time of producing the fuel cell stack 10, it is possible to suppress detachment of the second elastic seal member 92 from the second recess 86.

The fixed portion 100 includes a curved surface 100a protruding toward the bottom surface 87a of the second recess 86 in a ridge shape. The curved surface 100a partially contacts the bottom surface 87a of the second recess 86. It should be noted that the curved surface 100a and the bottom surface 87a of the second recess 86 are not adhered together, or melted together. However, the curved surface 100a may be partially adhered to (by adhesive) or melted to the bottom surface 87a of the second recess 86. In this case, it is possible to suppress positional displacement of the second elastic seal member 92 from the second recess 86 in the width direction, to a greater extent. Further, at the time of producing the fuel cell stack 10, it is possible to suppress detachment of the second elastic seal member 92 from the second recess 86 to a greater extent.

The first elastic seal member 90 and the second elastic seal member 92 offer the same advantages as in the case of the first elastic seal member 80 and the second elastic seal member 84.

Recesses (the first recess 82 and the second recess 86) are formed in the insulators 18a, 18b to provide seal members (the first elastic seal member 90 and the second elastic seal member 92) in the recesses.

The seal members (the first elastic seal member 90 and the second elastic seal member 92) include the seal bodies 94, 98 which contact the end seal beads (the first end seal line 52e and the second end seal line 62e), and the fixed portions 96, 100 provided for the seal bodies 94, 98. The seal bodies 94, 98 are spaced from the side surfaces 83, 87 forming the recesses (the first recess 82 and the second recess 86), and the fixed portions 96, 100 are held between the side surfaces 83, 87 forming the recesses (the first recess 82 and the second recess 86).

In the structure, it is possible to suppress positional displacement of the seal members (the first elastic seal member 90 and the second elastic seal member 92) from the recesses (the first recess 82 and the second recess 86) in the width direction.

The first elastic seal member 90 and the second elastic seal member 92 may be provided in the first recess 82 and the second recess 86 formed in end plates 20a, 20b shown in FIG. 12, respectively.

As shown in FIG. 15, the fuel cell stack 10 may include a first seal member 110 and a second seal member 112 instead of the first elastic seal member 80 and the second elastic seal member 84 described above. The first seal member 110 is provided at a position facing the second end seal line 62e.

The first seal member 110 includes a first metal plate 114 and a first elastic seal member 116. The first metal plate 114 and the first elastic seal member 116 are overlapped with each other in the stacking direction. The first metal plate 114 is supported by an insulator 18a which is an electrically insulating support member, and positioned between the second end seal line 62e and the first elastic seal member 116.

The first metal plate 114 contacts the insulator 18a, and the first metal plate 114 is slidable on the insulator 18a, in a direction perpendicular to the stacking direction indicated by the arrow A. The front end surface (ridge) of the second end seal line 62e and the first elastic seal member 116 are provided at positions which are overlapped with each other as viewed in the stacking direction of the stack body 14.

The first metal plate 114 and the second end metal separator 32e are made of the same kind of materials. Preferably, the first metal plate 114 and the second end metal separator 32e are made of the same material. However, the first metal plate 114 may be made of metal material having compositions different from those of the second end metal separator 32e as long as the liner expansion coefficient of the first metal plate 114 and the linear expansion coefficient of the second end metal separator 32e are substantially the same. The first metal plate 114 is a continuous single plate which faces the second end seal line 62e.

A width W11 of the first metal plate 114 is the same as the width W2 of the surface 81 of the first elastic seal member 80 described above (see FIG. 8). That is, the width W11 is larger than the width W3 (maximum width, see FIG. 8) of the front end surface (resin material 56b) of the second end seal line 62e. The width W11 is larger than the distance W4 between the protruding end of the first protrusion 63 and the protruding end of the second protrusion 65 (see FIG. 8).

A groove 118 accommodating the first elastic seal member 116 is provided in the insulator 18a. The groove 118 is provided at a position facing the second end seal line 62e. The first metal plate 114 is bridged over the groove 118. In the state where the first elastic seal member 116 is elastically compressed, the first elastic seal member 116 is held between the first metal plate 114 and the bottom of the groove 118. Therefore, the first elastic seal member 116 tightly contacts the first metal plate 114 and the bottom of the groove 118 to form an air-tight seal.

The insulator 18a includes a recess 120 having the groove 118. The recess 120 is provided at a position facing the second end seal line 62e. The first metal plate 114 is accommodated in the recess 120. A gap Se for permitting heat expansion of the first metal plate 114 is formed between an outer end 114e of the first metal plate 114 and a side wall surface 121 of the recess 120 facing the outer end 114e. The recess 120 surrounds the entire circumference of the recess 76a accommodating the terminal plate 16a.

The second seal member 112 is provided at a position facing the first end seal line 52e. The second seal member 112 includes a second metal plate 122 and a second elastic seal member 124. The second metal plate 122 and the second elastic seal member 124 are overlapped with each other in the stacking direction. The second metal plate 122 is supported by an insulator 18b which is an electrically insulating support member, and positioned between the first end seal line 52e and the second elastic seal member 124.

The second metal plate 122 contacts the insulator 18b, and the second metal plate 122 is slidable on the insulator 18b, in a direction perpendicular to the stacking direction indicated by the arrow A. The front end surface (ridge) of the first end seal line 52e and the second elastic seal member 124 are provided at positions which are overlapped with each other as viewed in the stacking direction of the stack body 14.

The second metal plate 122 and the first end metal separator 30e are made of the same kind of materials. Preferably, the second metal plate 122 and the first end metal separator 30e are made of the same material. However, the second metal plate 122 may be made of metal material having compositions different from those of the first end metal separator 30e as long as the liner expansion coefficient of the second metal plate 122 and the linear expansion coefficient of the first end metal separator 30e are substantially the same. The second metal plate 122 is a continuous single plate which faces the first end seal line 52e.

A width W12 of the second metal plate 122 is the same as the width W6 of the surface 85 of the second elastic seal member 84 described above (see FIG. 10). That is, the width W12 is larger than the width W7 (maximum width, see FIG. 10) of the front end surface (resin material 56a) of the first end seal line 52e. The width W12 is larger than the distance W8 between the protruding end of the first protrusion 53 and the protruding end of the second protrusion 55 (see FIG. 8).

A groove 126 accommodating the second elastic seal member 124 is provided in the insulator 18b. The groove 126 is provided at a position facing the first end seal line 52e. The second metal plate 122 is bridged over the groove 126. In the state where the second elastic seal member 124 is elastically compressed, the second elastic seal member 124 is held between the second metal plate 122 and the bottom of the groove 126. Therefore, the second elastic seal member 124 tightly contacts the second metal plate 122 and the bottom of the groove 126 to form an air-tight seal.

The insulator 18b includes a recess 128 having the groove 126. The recess 128 is provided at a position facing the first end seal line 52e. The second metal plate 122 is accommodated in the recess 128. A gap Sf for permitting heat expansion of the first metal plate 114 is formed between an outer end 122e of the second metal plate 122 and a side wall surface 129 of the recess 128 facing the outer end 122e. The recess 128 surrounds the entire circumference of the recess 76b accommodating the terminal plate 16b.

In FIG. 15, the seal members (the first seal member 110 and the second seal member 112) include the metal plates (the first metal plates 114 and the second metal plate 122) and the elastic seal members (the first elastic seal member 116 and the second elastic seal member 124) overlapped with each other at positions facing the end seal beads (the first end seal line 52e and the second end seal line 62e). The metal plates (the first metal plate 114 and the second metal plate 122) are supported by the insulators 18a, 18b, and positioned between the end seal beads (the first end seal line 52e and the second end seal line 62e) and the elastic seal members (the first elastic seal member 116 and the second elastic seal member 124).

That is, the metal plates (the first metal plate 114 and the second metal plate 122) having the rigidity higher than that of the elastic seal members (the first elastic seal member 116 and the second elastic seal member 124) and supported by the insulators 18a, 18b are positioned between the end seal beads (the first end seal line 52e and the second end seal line 62e) and the elastic seal members (the first elastic seal member 116 and the second elastic seal member 124). Therefore, in contrast with the case of using the seal member totally made of elastic material, it is possible to prevent inclination of the end seal beads (the first end seal line 52e and the second end seal line 62e).

Further, since the end seal bead (the first end seal line 52e and the second end seal line 62e) are supported by the metal plates (the first metal plate 114 and the second metal plate 122), it is possible to eliminate variation in the positions of the end seal beads (the first end seal line 52e and the second end seal line 62e) in the stacking direction, and suppress application of the excessive compression load to the metal separators (the first metal separator 30 and the second metal separator 32).

Further, since all of the metal plates (the first metal plate 114 and the second metal plate 122) and the end metal separators (the first end metal separator 30*e* and the second end metal separator 32*e*) are made of metal, and have the linear expansion coefficients that are similar to one another, it is possible to prevent displacement of the contact position between the metal plates (the first metal plate 114 and the second metal plate 122) and the end seal beads (the first end seal line 52*e* and the second end seal line 62*e*). Thus, it is possible to achieve the desired sealing performance between the end seal beads (the first end seal line 52*e* and the second end seal line 62*e*).

In the embodiment of the present invention, the resin film equipped MEA 28 is sandwiched between the first metal separator 30 and the second metal separator 32 to form the power generation cell 12, and the coolant flow field 66 is formed in each space between the adjacent power generation cells 12 to provide cooling structure for each of the power generation cells 12. Alternatively, for example, three or more metal separators and two or more membrane electrode assemblies (MEAs) may be provided, and the metal separators and the membrane electrode assemblies may be stacked alternately to form a cell unit. In this case, so called skip cooling structure where a coolant flow field is formed between the adjacent cell units is provided.

In the skip cooling structure, a fuel gas flow field is formed on one surface of a single metal separator, and an oxygen-containing gas flow field is formed on the other surface of the single metal separator. Therefore, one metal separator is provided between membrane electrode assemblies.

As in the case of the first seal line 52 and the second seal line 62, the seal members (the first elastic seal members 80, 90, the second elastic seal members 84, 92, and the first seal members 110, the second seal member 112) may extend in a wavy pattern in a plan view viewed in the stacking direction.

The present invention is not limited to the above described embodiment. It is a matter of course that various structures may be adopted without deviating from the gist of the present invention.

What is claimed is:

1. A fuel cells stack comprising a stack body including a plurality of power generation cells stacked in a stacking direction, the power generation cells each including a membrane electrode assembly and metal separators provided on both sides of the membrane electrode assembly, the membrane electrode assembly including an electrolyte membrane and electrodes on both sides of the electrolyte membrane, wherein a seal bead protruding in the stacking direction of the stack body is formed in the metal separator in a manner that the seal bead contacts an outer portion of the membrane electrode assembly or a frame provided on the outer portion of the membrane electrode assembly; and insulators and end plates sandwiching the stack body in the stacking direction are provided at both ends of the stack body in the stacking direction in a manner that the seal bead is deformed elastically, and wherein the stack body includes end metal separators positioned at both ends in the stacking direction;

an end seal bead protruding outward in the stacking direction is formed in each of the end metal separators;

each of the seal beads and the end seal beads extends in a wavy pattern in a plan view viewed in the stacking direction;

a seal member configured to contact the end seal bead is provided in an outer portion of the insulator or the end plate;

a width of the seal member is larger than a maximum width of the end seal bead;

the seal member extends straight in the plan view viewed in the stacking direction;

the end seal bead extending in the wavy pattern in the plan view viewed in the stacking direction includes a first protrusion protruding in a direction perpendicular to a direction in which the end seal bead extends, and a second protrusion protruding in a direction opposite to the direction in which the first protrusion protrudes; and the width of the seal member is larger than a distance between a protruding end of the first protrusion and a protruding end of the second protrusion.

2. The fuel cell stack according to claim 1, wherein a recess is formed in a surface of the insulator or the end plate facing the stack body, and the seal member is provided in the recess.

3. The fuel cell stack according to claim 1, wherein each of the metal separator and the end metal separator comprises:

a gas flow field configured to supply a reactant gas to the electrode; and a plurality of fluid passages for the reactant gas and a coolant; and the seal bead and the end seal bead are provided around the gas flow field, and around the fluid passages.

4. The fuel cell stack according to claim 1, wherein the end metal separator positioned at one end of the stack body in the stacking direction has same structure as the metal separator which contacts a surface of the outer portion or the frame of the membrane electrode assembly oriented toward another end in the stacking direction; and the end metal separator positioned at the other end of the stack body in the stacking direction has same structure as the metal separator which contacts a surface of the outer portion or the frame of the membrane electrode assembly oriented toward the one end in the stacking direction.

5. The fuel cell stack according to claim 1, wherein the entire seal member is made of elastic material.

6. The fuel cell stack according to claim 1, wherein a recess is formed in the insulator or the end plate, and the seal member is provided in the recess; and the seal member includes a seal body configured to contact the end seal bead and a fixed portion provided in the seal body, and wherein the seal body is spaced from side surfaces forming the recess; and the fixed portion is held between the side surfaces forming the recess.

7. The fuel cell stack according to claim 1, wherein the seal member comprises a metal plate and an elastic seal member that are overlapped with each other at a position facing the end seal bead; and the metal plate is supported by the insulator, and positioned between the end seal bead and the elastic seal member.

8. The fuel cell stack according to claim 7, wherein a groove configured to accommodate the elastic seal member is formed in the insulator or the end plate;

the metal plate is bridged over the groove; and the elastic seal member is held between the metal plate and a bottom of the groove in an elastically compressed state.

9. The fuel cells stack according to claim 8, wherein a recess configured to accommodate the metal plate is formed in the insulator or the end plate; and
a gap is formed between a side wall surface of the recess and the metal plate.

* * * * *